(12) United States Patent
Kajiyama et al.

(10) Patent No.: US 6,283,764 B2
(45) Date of Patent: *Sep. 4, 2001

(54) STORAGE MEDIUM PLAYBACK SYSTEM AND METHOD

(75) Inventors: Ryo Kajiyama; Tomihiro Yamazaki; Haruo Mukai; Hidemi Okada, all of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/829,232

(22) Filed: Mar. 31, 1997

(30) Foreign Application Priority Data

Sep. 30, 1996 (JP) .................................................. 8-259735

(51) Int. Cl.[7] ...................................................... G10H 1/36
(52) U.S. Cl. .................................. 434/307 A; 434/307 R; 434/318; 84/609; 84/610; 369/32
(58) Field of Search ........................... 434/307 A, 307 R, 434/308, 309, 318, 319, 365; 84/609, 610, 477 R; 360/18, 32, 131–136, 53; 369/32, 33, 43, 47.15, 47.3, 47.19, 47.22, 47.28, 47.16, 47.51, 53.29, 53.31, 59.19, 59.25, 59.26, 84; 386/84, 126

(56) References Cited

U.S. PATENT DOCUMENTS

| | | | |
|---|---|---|---|
| 4,813,011 | * | 3/1989 | Kulakowski et al. ................. 369/32 |
| 5,481,531 | * | 1/1996 | Yamamuro .......................... 369/47.3 |
| 5,519,681 | * | 5/1996 | Maeda et al. ...................... 369/47.16 |
| 5,561,815 | * | 10/1996 | Takata et al. ........................... 710/13 |
| 5,604,727 | * | 2/1997 | Ishihara ............................. 369/47.28 |
| 5,683,253 | * | 11/1997 | Park et al. ....................... 434/307 A |
| 5,768,234 | * | 6/1998 | Satomura .......................... 369/59.19 |
| 5,796,913 | * | 8/1998 | Takada et al. ....................... 386/125 |
| 5,810,599 | * | 9/1998 | Bishop ................................. 434/157 |
| 5,850,500 | * | 12/1998 | Hirayama et al. ..................... 386/97 |
| 5,880,388 | * | 3/1999 | Kajiyama et al. ..................... 84/609 |
| 5,902,115 | * | 5/1999 | Katayama ....................... 434/307 A |
| 5,914,930 | * | 6/1999 | Sasaki et al. ..................... 369/275.3 |
| 5,920,529 | * | 7/1999 | Ota et al. .............................. 369/84 |
| 5,930,208 | * | 7/1999 | Ohga et al. ............................ 369/30 |
| 6,064,639 | * | 5/2000 | Sako et al. ........................ 369/47.15 |

* cited by examiner

Primary Examiner—Joe H. Cheng
(74) Attorney, Agent, or Firm—Staas & Halsey LLP

(57) ABSTRACT

A first reading unit reads data stored in a second storage area of a storage medium (including reproduction management information), and stores it in another storage medium. A first reproducing unit reproduces the data read from a first storage area of a storage medium by the first reading unit. A second reading unit reads data stored by the first reading unit in another storage medium, and outputs it to a second reproducing unit. The second reproducing unit reproduces data received from the second reading unit. A controlling unit synchronizes the reproduction of the data by the first reproducing unit with the reproduction of the data by the second reproducing unit.

18 Claims, 19 Drawing Sheets

(WHEN ORIGINAL TRACK IS 1 AND KARAOKE TRACK IS 3)

| WORDS | We are the challengers. | |
|---|---|---|
| TRANSLATED WORDS | 俺たちは挑戦者だ | |
| PRONUNCIATION | ｵｲﾗｱｰ ｻﾞ ﾁｬﾚﾝｼﾞｬｰｽﾞ | |
| ORIGINAL PHRASE START TIME | 1. 00:20:44 | ——— (1) |
| ORIGINAL PHRASE END TIME | 1. 00:25:70 | ——— (2) |
| KARAOKE PHRASE START TIME | 3. 00:20:44 | ——— (3) |
| KARAOKE PHRASE END TIME | 3. 00:25:70 | ——— (4) |

F I G. 7

STORAGE MEDIUM PLAYBACK SYSTEM AND METHOD

BACKGROUND OF THE INVENTION

1. Field of the Invention

The present invention relates to a storage medium having a plurality of storage areas distinguished by stored data such as a format, etc., and to a technique for playing back data stored in the storage medium.

2. Description of the Related Art

In recent years, remarkable progress in information compression technology and in semiconductor technology has been made. For example, the international standards such as MPEG 1 and 2 have been made, so that standards for storage media for storing information are frequently revised. Recently, the standardization of DVDs (Digital Video Discs) has been completed. For CDs (Compact Discs), multimedia-conscious standards are frequently proposed. A CD which is conscious of multimedia is called being an enhanced CD.

The enhanced CD includes two storage areas distinguished by data format. One area is for storing the same CD-DA (Digital Audio) data as that of a conventional music CD, while the other is an area for storing CD-ROM data. Image data (including data encoded with the MPEG encoding method) such as a promotional video, record jacket, etc., can be stored as the CD-ROM data. Therefore, the enhanced CD attracts public attention as a tool for providing entertainment over and above the conventional music CD.

As is known, enhanced CDs are classified into three major types depending on their format. The first of these types is called mixed mode, the second is called multi-session, and the third is called CD-ROM ready. The multi-session type can store CD-DA data in tracks 1 through 99 in a similar manner as in a music CD, unlike the other types. It allows a conventional music CD player to play back music. This is the reason why the multi-session type is of the greatest interest to the general public. The multi-session type is normally called a CD-EXTRA.

In the meantime, the number of personal computers (hereinafter abbreviated to PCs) has been remarkably increasing in recent years, and PCs have been equipped with a CD-ROM device as standard. The PCs equipped with the CD-ROM device can only use a CD-EXTRA (enhanced CD) by adding the MPEG decoding capability. The number of PCs equipped with the MPEG decoding capability as standard has also been growing in recent years. Therefore, the number of CD-EXTRAs (enhanced CDs) sold for PCs is expected to significantly increase.

Because PCs are equipped with a CD-ROM device as standard, a device for accessing a DVD is expected to be included in PCs, by adding a capability for accessing a DVD in addition to a capability for playing back a CD-ROM (including an enhanced CD), etc.

The enhanced CD such as the above described CD-EXTRA, etc. allows high quality sound and a variety of videos to be enjoyed in a similar manner as with a music CD. Conventionally, sound and video are played back by basically reproducing data sequentially read from a CD. In other words, data of various representation media such as video (still pictures, moving pictures, photos, etc.), music, etc. can be recorded, but those data are not fully utilized. The same thing is said about storage medium other than the enhanced CD.

SUMMARY OF THE INVENTION

The object of the present invention is to allow data stored in a storage medium to be fully utilized, and to be reproduced in various forms.

A storage medium according to the present invention includes first and second storage areas distinguished by stored data, and stores reproduction management information for synchronizing and reproducing data respectively stored in the first and second storage areas, in one of the first and second storage areas, and a program storing a capability for reproducing data stored in one of the first and second storage areas in synchronization with the data stored in the other of the first and second storage areas, in another storage medium, in one of the first and second storage areas.

It is desirable that the above described program should include the capability for storing the data stored, from the storage medium including the first and second storage areas distinguished by stored data, in another storage medium. However, since this capability may sometimes be implemented by another program (such as an operating system, etc.), it is not essential.

A storage medium playback system according to the present invention comprises a first reading unit for reading data stored in one of the first and second storage areas from a storage medium including the first and second storage areas distinguished by stored data, and storing the data in another storage medium; a first reproducing unit for reproducing data which is stored in the other of the first and second storage areas read by the first reading unit; a second reading unit for reading data stored in another storage medium; a second reproducing unit for reproducing the data read by the second reading unit; and a controlling unit for synchronizing the reproduction of the data by the first reproducing unit with the reproduction of the data by the second reproducing unit, based on reproduction management information, which is prepared in advance, for synchronizing and reproducing the data respectively stored in the first and second storage areas.

The data respectively stored in the first and second storage areas can simultaneously be reproduced in parallel by storing the data stored in one of the first and second storage areas in another storage medium. The controlling unit synchronizes and reproduces those data based on the reproduction management information. With these operations, the data respectively stored in the first and second storage areas can arbitrarily be combined, and the proceeding status of the reproduction of combined data can be managed.

To synchronize and reproduce a plurality of data such as CD-DA data, there arises the demand for obtaining a reproduction point in a data stream (including a relationship of relative reproduction points in combined data in this case), depending on the data. The above described reproduction management information is intended to obtain the reproduction point. With the reproduction management information, the reproduction point in a data stream can be obtained. Therefore, reproduction can be started from an arbitrary point in the data, or data to be reproduced can be switched depending on a reproduction point. In other words, the number of options for data reproduction is increased, and data can be reproduced in a variety of forms.

The above described feature can also be applied to the storage medium playback method, according to the present invention.

BRIEF DESCRIPTION OF THE DRAWINGS

FIG. 7 exemplifies extracted data corresponding to one phrase;

DESCRIPTION OF THE PREFERRED EMBODIMENTS

Figure 1:
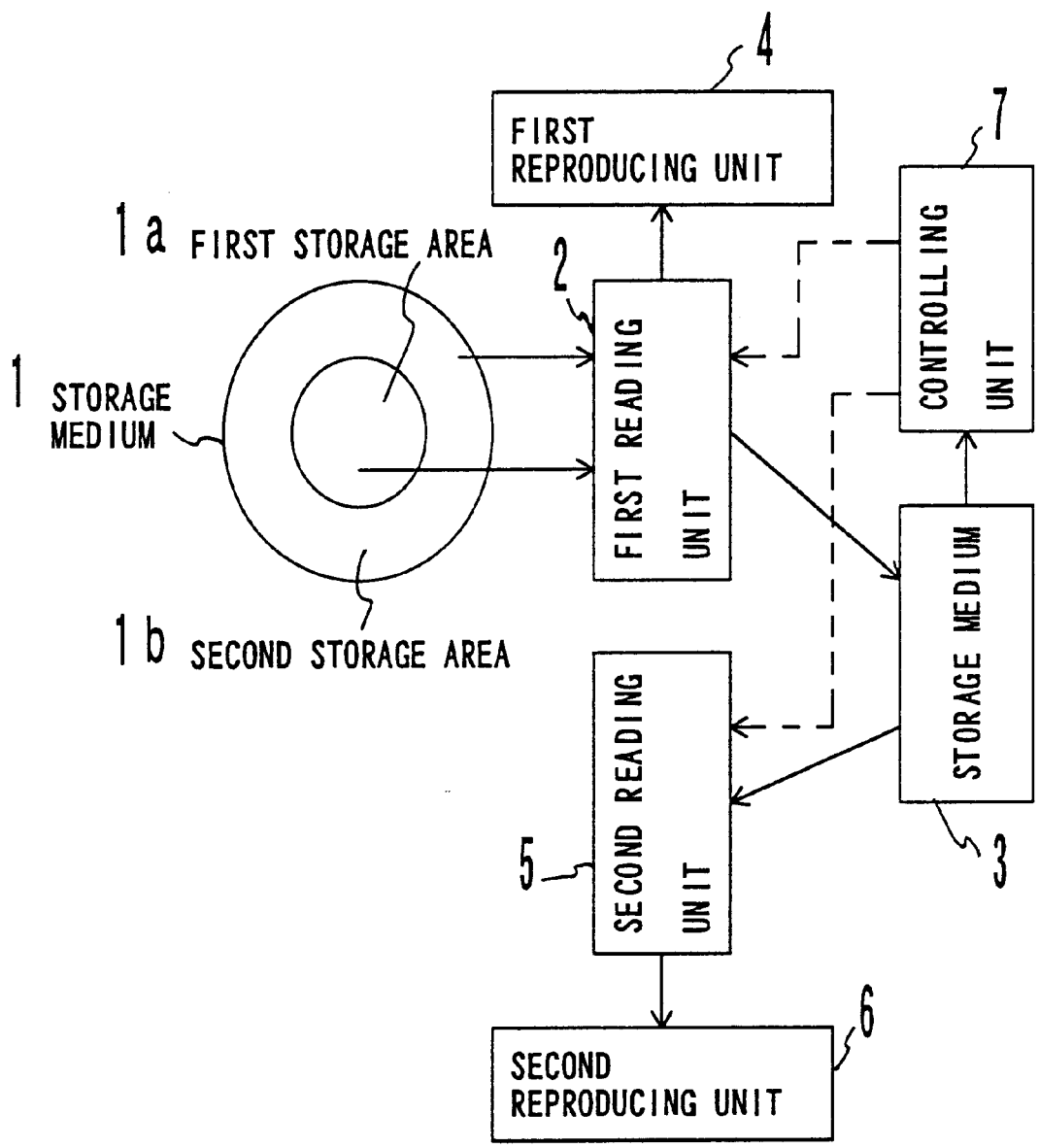
FIG. 1 is a block diagram showing the system configuration of a first embodiment.

Provided below are the explanations about the details of the embodiments according to the present invention, by referring to the drawings.

<First Embodiment>

FIG. 1 is a block diagram showing the configuration of a storage medium playback system (hereinafter referred to as a sound playback/display system) according to the first embodiment of the present invention. The explanation about the system configuration of the first embodiment is provided below by referring to FIG. 1.

A storage medium 1 includes first and second storage areas 1a and 1b respectively, which are distinguished by stored data. The distinction by stored data is made by the difference between data reproduction forms such as the difference between sound and video, the difference between representation media such as text, sound, moving pictures, still pictures, etc., or the difference between data formats. As the storage medium 1, an enhanced CD (such as a CD-EXTRA), DVD, optical disc, magneto-optical disc, etc. are available.

A first reading unit 2 reads data stored in the second storage area 1b of the storage medium 1, and stores the read data in a storage medium 3. The storage medium 3 may store all of data stored in the second storage area 1b, or data extracted from among the data stored in the second storage area 1b. Assuming that the system shown in FIG. 1 is configured by using a PC, a main storage device or an auxiliary storage device (hard disk, etc.) correspond to the storage medium 3.

The first reading unit 2 further reads data stored in the first storage area 1a of the storage medium 1, and outputs the data to a first reproducing unit 4. The first reproducing unit 4 reproduces the data received from the first reading unit 2.

A second reading unit 5 reads data stored in the storage medium 3 by the first reading unit 2, and outputs the read data to a second reproducing unit 6. The second reproducing unit 6 reproduces the data received from the second reading unit 5.

The data respectively stored in the first and second storage areas 1a and 1b can be reproduced simultaneously (in parallel), by storing the data included in the second storage area 1b of the storage medium 1 in the storage medium 3. In other words, a combination of data of various representation media stored in the storage medium 1, and a reproduction timing of those data, can arbitrarily be selected and controlled. In this way, a wider variety of user entertainment options and use forms are realized. As a result, the entertainment value of the storage medium 1 can be increased.

A controlling unit 7 synchronizes the reproduction of data that the first reading unit 2 reads from the first storage area 1a of the storage medium 1, using the first reproducing unit 4, with the reproduction of data that the second reading unit 5 reads from the storage medium 3 (data stored in the second storage area 1b of the storage medium 1), using the second reproducing unit 6.

If there is a correspondence between the data to be reproduced by the first and second reproducing unit 4 and 6, for example, between music and a video corresponding to that music, the controlling unit 7 synchronizes and reproduces those data based on the prepared reproduction management information. The reproduction management information is information for defining a correspondence between associated data for each reproduction unit of data (such as one phrase of music, one frame of a still picture, etc.). With such reproduction management information, specification of an arbitrary reproduction point (based on a reproduction start time, reproduction end time, etc.) such as an intermediate point of a musical piece, can be made, and the reproduction of the different data at the specified reproduction point can be synchronized.

According to this embodiment, the controlling unit 7 obtains the reproduction management information from the storage medium 3 by preparing the reproduction management information stored in the second storage area 1b of the storage medium 1, and storing it in the storage medium 3 together with the data stored in the second storage area 1b. This process eliminates the need for preparing a further storage medium to store the reproduction management information. Additionally, preparation of only the storage medium 1 enables data stored in different storage areas to be synchronized. This leads to advantages in cost, operability, etc.

PCs currently on the market are equipped with all of the components corresponding to the above described devices and storage medium 3 in terms of hardware, or can easily be equipped with all of them, even if they are currently equipped with none. Since most PCs are now being shipped as multimedia PCs, they are equipped with all of the capabilities required for configuring a sound playback/display system which implements the present invention.

Accordingly, a program including the capabilities for implementing the above described operations of each of the devices may be stored in the storage medium 1, and a user may purchase the storage medium 1. If such a program is stored in the storage medium 1, a user having a personal computer can configure the sound playback/display system only by purchasing that storage medium 1. Such a user can easily configure the system, at less cost to the user. As a result, the user can get benefits in cost, operability, etc.

<Second Embodiment>

Figure 2:
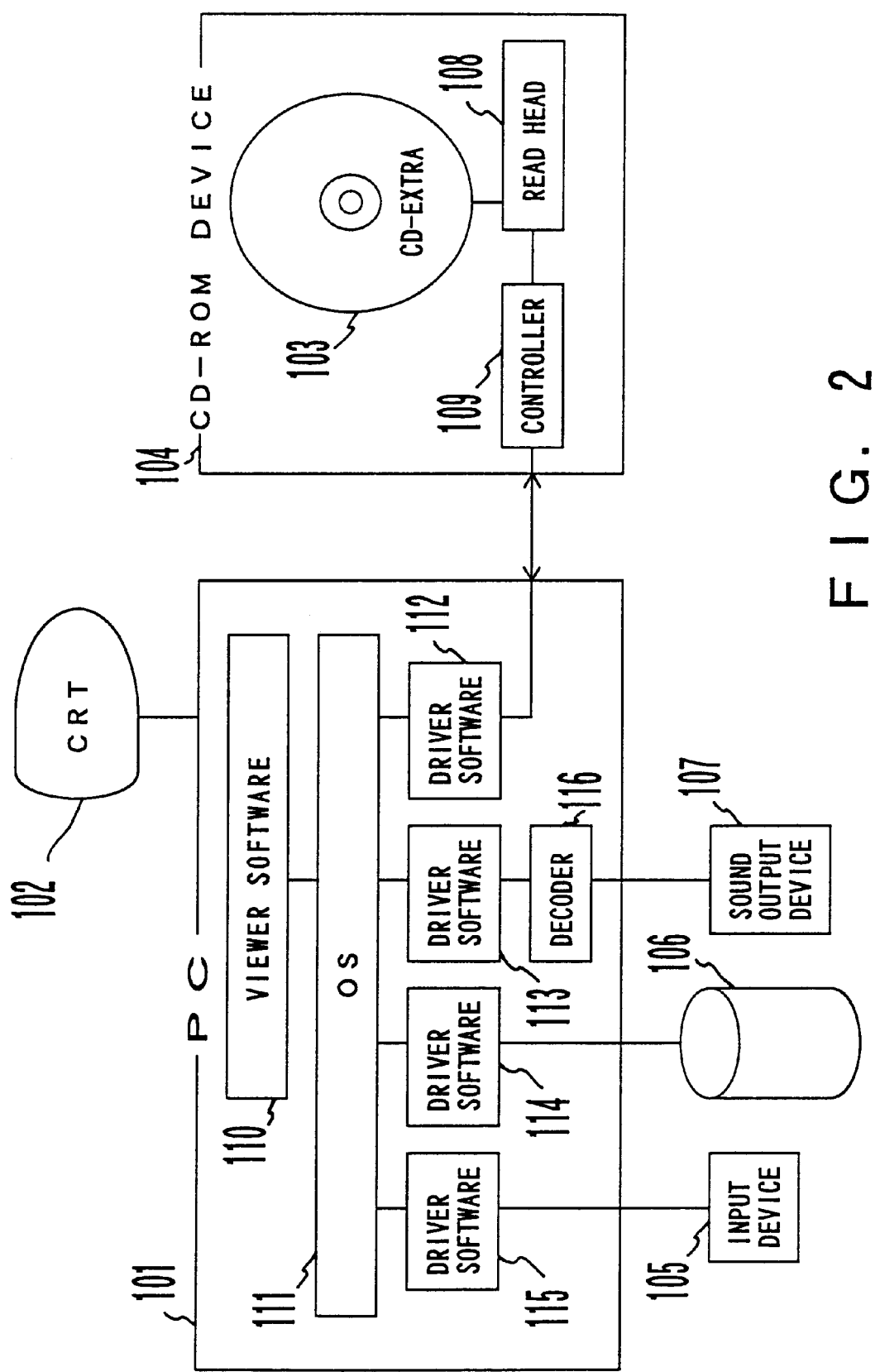
FIG. 2 is a block diagram showing the system configuration of a second embodiment.

FIG. 2 is a block diagram showing the configuration of a sound playback/display system according to the second embodiment.

In FIG. 2, 101 is a PC (main body) equipped with multimedia capabilities. The sound playback/display system is configured by using the PC 101. As shown in FIG. 2, the PC 101 comprises a CRT 102 as a display device, CD-ROM device 104, input device (such as a keyboard, pointing device, etc.) 105, auxiliary storage device 106, and a sound output device (such as a speaker) 107. An enhanced CD and a music CD in addition to a CD-ROM are available for the CD-ROM device 104. A storage medium according to the second embodiment is a CD-EXTRA 103 which is one type of enhanced CD, and one type that the present invention is applied to.

Figure 3:
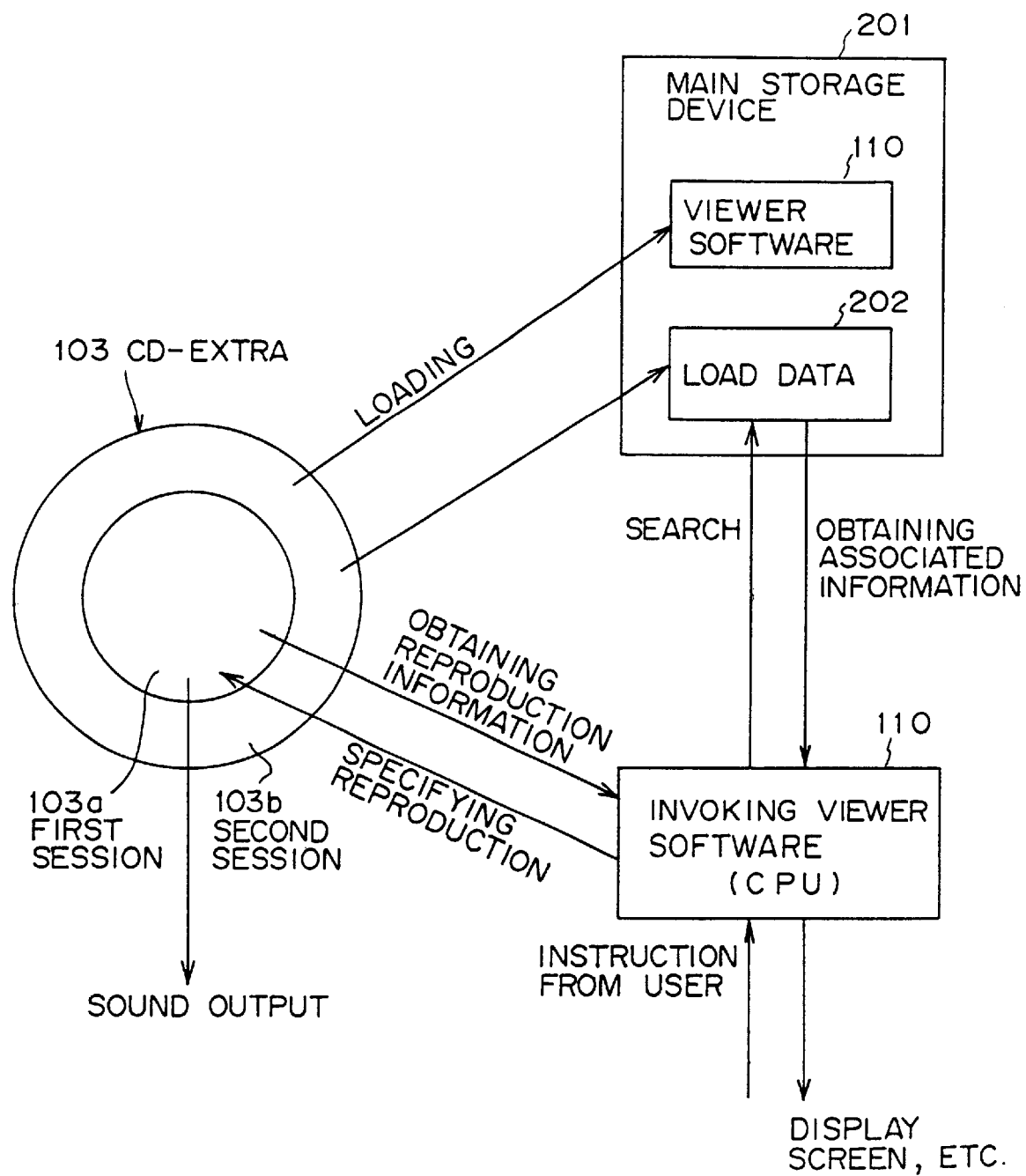
FIG. 3 is a schematic diagram showing the concept of the fundamental operations of data reproduction according to the second embodiment.

FIG. 3 is a schematic diagram showing the concept of the fundamental operations for reproducing data according to the second embodiment. Prior to the detailed explanation about FIG. 2, the explanation about the fundamental operations for reproducing the contents and data stored in the CD-EXTRA 103 according to the second embodiment, is provided by referring to FIGS. 3 through 7.

The program area of the CD-EXTRA (storage medium) 103 is partitioned into two areas, that is, a first session 103a, and a second session 103b, according to the format of stored data. CD-DA tracks are arranged in the first session 103a, while data tracks are arranged in the second session 103b. Additionally, the innermost track (read-in area) of the CD-EXTRA 103 stores TOC (Table of Contents) information indicating the start address etc. of each of the tracks, which is not shown in the figure, in a similar manner as in a music CD.

Figure 4:
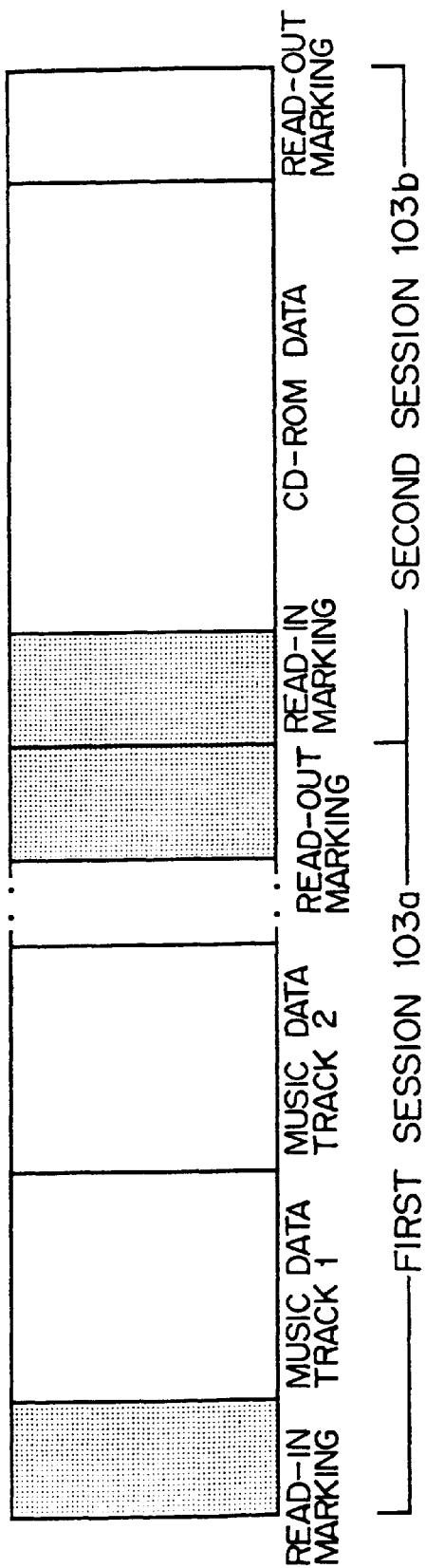
FIG. 4 is a schematic diagram explaining the structure of data included in a CD-EXTRA.

FIG. 4 shows the data structure of the CD-EXTRA 103.

As shown in FIG. 4, the first session 103a stores data (music data) of CD-DA tracks, while the second session 103b stores data in the same format as that of a CD-ROM. The second session 103b can also store MPEG data (audio/video data). These sessions are delimited by read-in and read-out markings. These markings enable a CD player for normal music CDs to play back the data stored in the first session 103a. Hereinafter, the data stored in the first and second sessions 103a and 103b are respectively referred to as CD-DA data and CD-ROM data.

The data stored in the CD-EXTRA 103 are managed as files classified in a hierarchical structure, similar to a CD-ROM. An OS (operating system) 111 shown in FIG. 2 installed in the PC 101 is assumed to comprise a capability (auto-play capability) for determining whether or not a file having a predetermined name (such as an autorun.inf file) is included when a CD is loaded into the CD-ROM device 104, and performing a process according to the described contents if the file is included.

Accordingly, the file having the predetermined name, which describes the contents to be executed by the OS 111 is stored in the second session 103b of the CD-EXTRA 103. The second session 103b stores also viewer software 110 which is the application software for reproducing (displaying) data stored in the second session 103b in synchronization with the reproduction of the CD-DA data stored in the first session 103a.

The file having the predetermined name includes the description for loading (copying) the viewer software 110, specified data in the second session 103b, for example, the information about a disc (album), text data such as the title or/and words of the musical piece, and picture data (MPEG encoded data (including video or/and audio data)), into the main storage device 201 (part of the above described data is also loaded into the auxiliary storage device 106 depending on the capacity or use state of the main storage device 201) in the PC 101, so that the viewer software 110 is invoked. Accordingly, the contents of the description are implemented by the OS 111. Note that the data loaded into the PC 101 is hereinafter referred to as load data 202, in order to make a distinction from other data.

By loading the data stored in the second session 103b into the PC 101, the data stored in the different areas, such as the first and second sessions 103a and 103b, can be simultaneously processed, (reproduced), and arbitrarily combined, and the timing for reproducing those data can arbitrarily be controlled. Furthermore, since the viewer software 110 is stored in the CD-EXTRA 103, a user having the required items of hardware can implement the sound playback/display system according to the second embodiment, only by purchasing the CD-EXTRA 103. This reduces the cost to the user.

According to the second embodiment, the OS 111 copies the load data 202. However, the viewer software 110 may include the capability for determining whether or not the load data 202 is copied to the main storage device 201, and for copying it to the main storage device 201 if it has not yet been loaded, for an OS which does not include the above described auto-play capability. In this way, the load data 202 is copied to the main storage device 201 regardless of the existence/non-existence of the auto-play capability. That is, it improves the operability.

After the viewer software 110 is loaded into the main storage device 201 according to the description of the above described file, the OS 111 instructs the CPU to invoke the viewer software 110 as shown in FIG. 3. Once the viewer software 110 is invoked, moving pictures, still pictures, and sound depending on a user instruction are reproduced according to a predetermined reproduction procedure. The TOC information stored in a read-in area in the CD-EXTRA 103 is stored in the main storage device 201, and used to identify or specify a reproduction point of the CD-EXTRA 103.

When a user instructs the reproduction of the data (CD-DA data) stored in the first session 103a, the viewer software 110 starts reproducing the CD-DA data that the user desires by determining the reproduction start point in the first session 103a according to the contents of the instruction, and instructing the CD-ROM device 104 of the reproduction start point.

In the meantime, the viewer software 110 retrieves associated information (data) to be reproduced together with the CD-DA data, from the load data 202, and displays the retrieved information on a screen.

Figure 5:
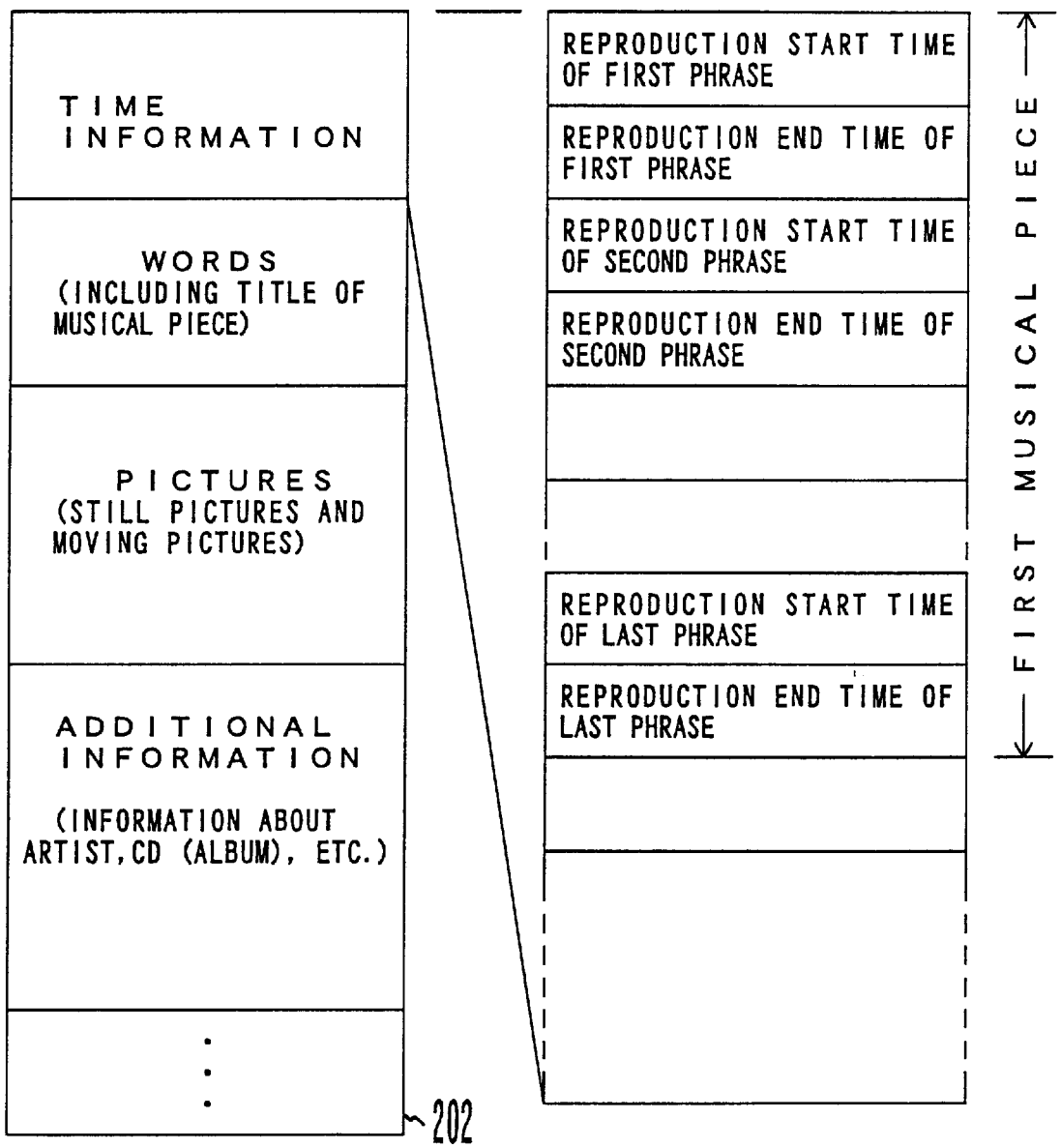
FIG. 5 is a schematic diagram explaining the structure of data loaded into a PC.

FIG. 5 is a schematic diagram showing the structure of data loaded from the second session 103b in the CD-EXTRA 103 to the PC 101.

As shown in this figure, time information (reproduction management information), words, pictures, additional information, and other data are loaded into the PC 101 as the load data 202. The time information among these information is intended to synchronize CD-DA data stored in the first session 103a with the corresponding (associated) data, and reproduce them simultaneously.

As is known, the time unit "MSF" (M: minute, S:second (00-59), F:frame (00-74)) is used td indicate the position of the CD-DA data stored in a track of a musical CD. Since a normal music CD player can play back the CD-DA data in the CD-EXTRA 103, that time unit is employed for the first session 103a in which the CD-DA data is stored. Accordingly, this time unit is employed for representing the time information. Other units, such as a number of sectors, etc., may also be employed as the time unit.

In the meantime, the reproduction unit for music is employed because "MSF" is employed for representing the time information. Specifically, a phrase is employed as the reproduction unit. The reproduction point of a phrase is managed using reproduction start and end times of each phrase, as shown in FIG. 5. In this way, the reproduction point of a musical piece can be specified in phrases.

Data to be reproduced in synchronization with the CD-DA data, such as words, pictures, etc., are divided into phrases, and their correspondences are defined. The definition of a correspondence is made by putting the time information into array variables, and putting the data such as words, pictures, etc., or corresponding storage information (file name, etc.) about the data into array variables. With this process, the reproduction of the data to be reproduced in synchronization with the CD-DA data, can be managed in phrases.

The correspondence between a musical piece and data to be reproduced in synchronization with the musical piece can be identified, for example, by preparing a file defining the correspondence between them.

Figure 6B:
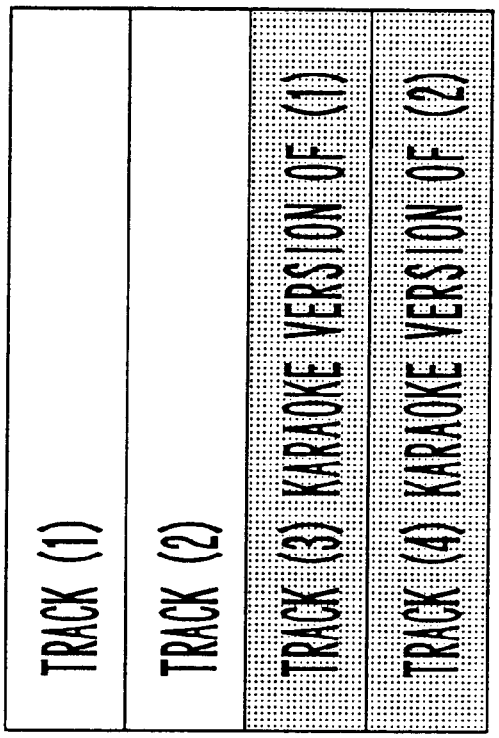
FIGS. 6A and 6B exemplify the contents stored in a first session in the CD-EXTRA.
Figure 6A:
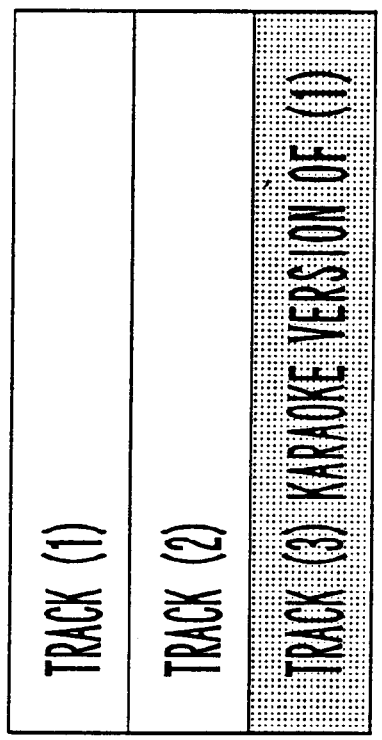

FIG. 6 (FIGS. 6A and 6B) exemplify the contents stored in the first session 103a in the CD-EXTRA 103, and FIG. 7 exemplifies extracted data corresponding to one phrase. Provided below is the specific explanation about the correspondence between data, which is defined as described above, by referring to these figures.

In FIGS. 6A and 6B, numerals (1) through (4) indicate track numbers, and tracks storing music data for a karaoke version are shown shaded. That is, FIG. 6A shows the first session 103a in which each of the tracks numbered (1) and (2) stores each of original versions of musical pieces, and the track numbered (3) stores the karaoke version of the musical piece stored in the track numbered (1). FIG. 6B shows the first session 103a in which each of the tracks numbered (1) and (2) stores each of original versions of musical pieces, and each of the tracks numbered (3) and (4) stores each of the karaoke versions of the musical pieces stored in the tracks numbered (1) and (2).

Here, karaoke is a performance which is a musical accompaniment of a popular song. Additionally, karaoke means singing a song to the tune of the music accompaniment.

The reason why the karaoke versions are stored in addition to the original versions of musical pieces as shown in FIGS. 6A and 6B is that karaoke has become a popular form of entertainment. FIG. 7 specifically exhibits part of the data (text data such as words, translated words, and pronunciation) extracted from the load data 202 with a user's specification of a certain phrase in a musical piece stored in the tracks numbered (1) and (3), on the condition that the contents shown in FIG. 6A or 6B are stored in the first session 103a.

In FIG. 7, numerals (1) through (4) indicate time information (refer to FIG. 5). As shown in this figure, when different performance types of an identical musical piece are stored in a plurality of tracks, the time information in each track is linked. This is because data synchronized with the reproduction of CD-DA data is made common to the original and karaoke versions, and a user can select to reproduce either of the original and karaoke versions.

The four numerical values of the time information (1) through (4), which are represented and delimited by a comma ",", and colons ":", respectively indicate a track number, minutes (M), seconds (S), and a frame number (F) from the left side of the drawing. Accordingly, the time for performing the phrases shown in FIG. 7 is 5(=25−20) seconds 26(=70−44) frames.

As described above, the correspondence between the data stored in the first and second sessions 103a and 103b is defined in the reproduction units (phrases according to this embodiment). Such a definition allows those data to be synchronized in reproduction units and reproduced, and a reproduction point to be specified in the reproduction units.

Once the CD-ROM device 104 starts reading and reproducing the CD-DA data, the viewer software 110 sequentially obtains the reproduction information (information indicating a current reproduction point) from the data received from a controller 109 in the CD-ROM device 104, monitor its progress, identifies data to be displayed next by comparing the reproduction information with the time information, obtains the identified data from the load data 202, and displays it, as shown in FIG. 3. With this process, the CD-DA data and its associated data in the load data 202 are synchronized and reproduced.

Referring to FIG. 2.

If a CD-EXTRA 103 is loaded into the CD-ROM device 104, for example, the controller 109 detects it. The controller 109 then makes a read head 108 perform seek operations in order to read TOC information stored in a read-in area in the CD-EXTRA 103, and makes the read head 108 perform seek operations outside the read-in area in order to identify the type of the CD (whether or not it is an enhanced CD) loaded into the CD-ROM device 104 based on the markings (refer to FIG. 4). The controller 109 notifies the OS 111 via driver software 112 that a CD is loaded into the CD-ROM device 104, and at the same time, it passes the TOC information and the information indicating the type of the CD, to the OS 111.

The data stored in the CD is modulated, for example, with the modulation method, called "EFM" (Eight to Fourteen Modulation). After the controller 109 demodulates the data read by the read head 108 from the CD, it passes the demodulated data to the OS 111 via the driver software 112.

When receiving the above described information via the driver software 112, the OS 111 reads the data stored in the CD loaded into the CD-ROM device 104 based on the TOC information, examines the contents stored in the CD, and identifies the type of the CD. If the CD is not determined to be a music CD, the OS 111 determines whether or not a file having a predetermined name is included in the files stored in the CD. If the file having the predetermined name is stored, the OS 111 performs a process according to the contents described in that file. With this process, the viewer software 110 and load data 202 specified in the second session 103b are loaded into the main storage device 201, and the viewer software 110 is invoked as described above.

If there is not enough space for storing the data in the main storage device 201, the OS 111 stores the excess data in the auxiliary storage device 106 via the driver software 114.

After the viewer software 110 is invoked, it stores the TOC information in the read-in area of the CD-EXTRA 103 in the main storage device 201. Then, it reproduces the data according to a predetermined reproduction procedure. For example, the viewer software 110 displays an explanation about the contents (title, and information about an artist (photo, name, etc.), information about a CD maker, etc.) stored in the CD-EXTRA 103 on the CRT 102 as still pictures or moving pictures, immediately after it is invoked, and then displays pictures on a display screen of CRT 102 having a predetermined structure. After that, the viewer software 110 identifies the data to be reproduced according to a user instruction, and displays the data to be displayed on a screen having a predetermined structure.

Figure 8:
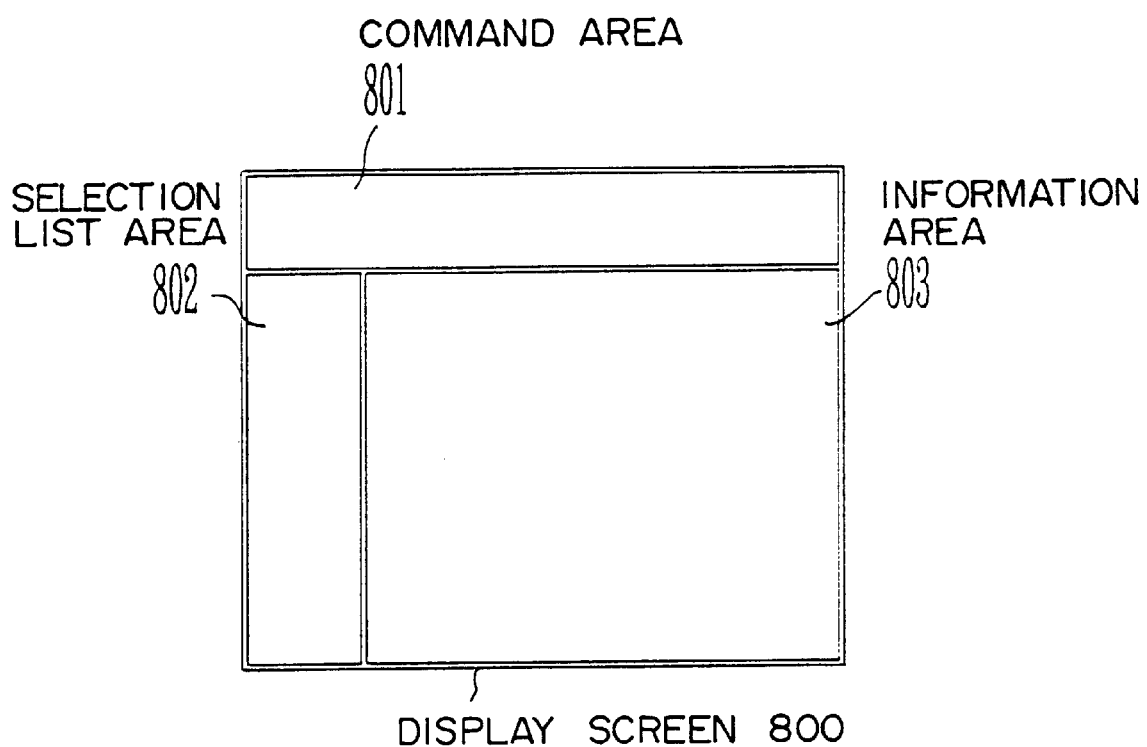
FIG. 8 is a schematic diagram showing the structure of a display screen according to the second embodiment.

FIG. 8 shows a structure of the display screen.

As shown in FIG. 8, a display screen 800 is composed of three areas. That is, a command area 801 positioned at the top of the display screen 800, a selection list area 802 positioned on the left of the display screen 800, and an information area 803 occupying the remaining area. Each of the areas 801 through 803 displays the following.

The command area 801 displays the title of the CD-EXTRA 103, the title of a musical piece or a video being reproduced, and each of different types of buttons (not shown in this figure) for specifying the reproduction of the CD-EXTRA 103 by a user. The buttons relating to the reproduction operations such as a playback, stop, fast forward, rewind, repeat, etc., and the buttons for setting various modes are displayed. Also an EXIT button for instructing the termination of the viewer software 110 is displayed.

The selection list area 802 is a selection list box for displaying the list of musical pieces, videos, etc. stored in the CD-EXTRA 103. A user moves a mouse cursor, for example, to the title of a displayed musical piece, and clicks the mouse, so that he or she can specify that musical piece.

The information area 803 is an area for displaying general-purpose information including text information such as words and translated words of the musical piece whose reproduction is currently specified, and reproduced pictures (still pictures or moving pictures). In the information area 803, for example, the words are displayed in the form shown in FIG. 9. "M" shown in FIG. 9 is a mouse cursor.

The user moves the mouse cursor "M", and clicks using the input device 105 (mouse, etc.). The contents of the user instruction operation performed with the input device 105 is transmitted to the OS 111 via the driver software 115. The OS 111 analyzes the contents of the instruction operation, performs a process according to a user instruction (move operation of the mouse cursor "M", etc.), and passes the result of the analysis to the viewer software 110 depending on need. With this process, the viewer software 110 reproduces the data that the user desires by changing the mode setting, switching the data to be reproduced, etc.

The input device 105 that the user operates the most often is a pointing device. Since a mouse is the most frequently used pointing device, the input device 105 is hereinafter referred to as the mouse.

If the user clicks the title of a video displayed in the selection list area 802, and instructs the playback of the video (MPEG audio/video data), the viewer software 110 reproduces it according to the following procedure.

The viewer software 110 identifies the name of the file storing a corresponding video according to the title that the user clicked. After identifying the file name, the viewer software 110 references the file management information stored in a predetermined area in the second session 103b, and identifies its reproduction start point (normally the beginning of the file). Then, the viewer software 110 passes the identified reproduction start point to the CD-ROM device 104 as a control command via the OS 111 and driver software 112. The controller 109 which receives the control command makes the read head 108 perform seek operations, and starts reading data.

After the controller 109 demodulates the data read by the read head 108, the demodulated data is transmitted to the viewer software 110 via the driver software 112 and OS 111. The viewer software 110 transmits the data transmitted from the controller 109 to the decoder 116 via the OS 111 and driver software 113. The data transmitted to the decoder 116 at this time is an MPEG bit stream in which audio and video data encoded with the MPEG 1 encoding method are interleaved.

The decoder 116 is an MPEG board equipped with, for example, a D/A conversion capability (DA (Digital to Analog) converter) for an output of an analog audio signal, and an overlay capability for synthesizing a graphic screen from the main body of the PC 101 with decoded pictures. The decoder 116 separates the MPEG bit stream into audio and video streams, and decodes the respective streams. Additionally, the decoder 116 performs the D/A conversion of the decoded data (CD-DA data), and outputs analog audio signals.

The decoded audio data is output to a sound output device 107 via the DA converter. The sound output device 107 is, for example, a speaker or headphones, and sound is output according to an audio signal input from the decoder 116. The decoded picture data is combined with the graphic screen data generated by the viewer software 110 and OS 111. The combined data is then displayed on the CRT 102.

As is generally known, there is a difference in a time required for the decoding to the reproduction process between MPEG audio data and MPEG video data. The decoder 116 eliminates this difference using a buffer, not shown in this figure, in order to synchronize the sound and pictures.

If a user clicks the title of a musical piece displayed in the selection list area 802, and instructs the playback of the musical piece, the viewer software 110 reproduces it according to the following procedure.

First of all, the viewer software 110 obtains the number of the track (CD-DA track) storing the musical piece having the clicked title, and the data to be reproduced in synchronization with that musical piece, from the load data 202 based on the clicked title. The data to be obtained is identified, for example, by referencing the file defining the data synchronized with each musical piece. To facilitate understanding, the following explanation is provided based on the assumption that the data synchronized with the playback of the musical piece is its words.

After obtaining the word data from the load data 202, the viewer software 110 divides the word data into, for example, phrases, and displays the divided phrases in the information area 803, as shown in FIG. 9. Additionally, the viewer software 110 references the TOC information, transmits the start point of the track identified according to the title of the musical piece, to the controller 109 in the CD-ROM device 104, and makes the controller 109 start reading the data stored in that track. As a result, the CD-DA data is transmitted from the controller 109 to the viewer software 110 via the driver software 112 and OS 111.

The viewer software 110 transmits the CD-DA data to the decoder 116 via the OS 111 and driver software 113 to play back the musical piece. Furthermore, the viewer software 110 monitors the proceeding status of the playback by obtaining the current reproduction point, for example, from the data of a Q channel in a subcode included in the CD-DA data, and notifies the user of the current reproduction point by highlighting the phrase currently being reproduced in synchronization with the progress of the musical piece.

As shown in FIG. 5, the time information is data including the reproduction point in phrases. Therefore, after the current reproduction point is obtained from the CD-DA data, the associated data is displayed on the CRT 102 in synchronization with the reproduction of the CD-DA data (music) in phrases.

According to the second embodiment, the user can specify the reproduction point in phrases, since the reproduction point is defined as the time information in phrases. If the original and karaoke versions of an identical musical piece are stored in the first session 103a as shown in FIG. 6, also the specification of which of the versions to play back can be made. Provided below is the explanation about how to make this specification, by referring to FIGS. 9A and 9B.

Figure 9A:
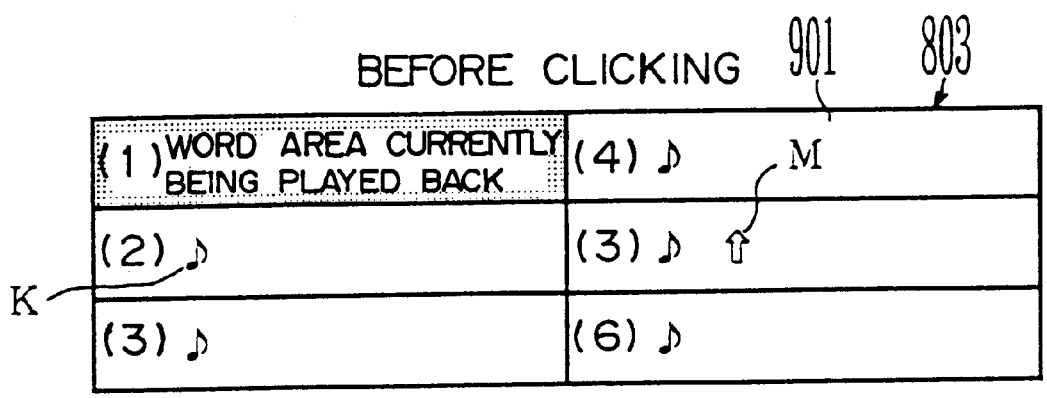
FIGS. 9A and 9B are schematic diagrams explaining a method for specifying playback contents of a performance, and a display state of words.
Figure 9B:
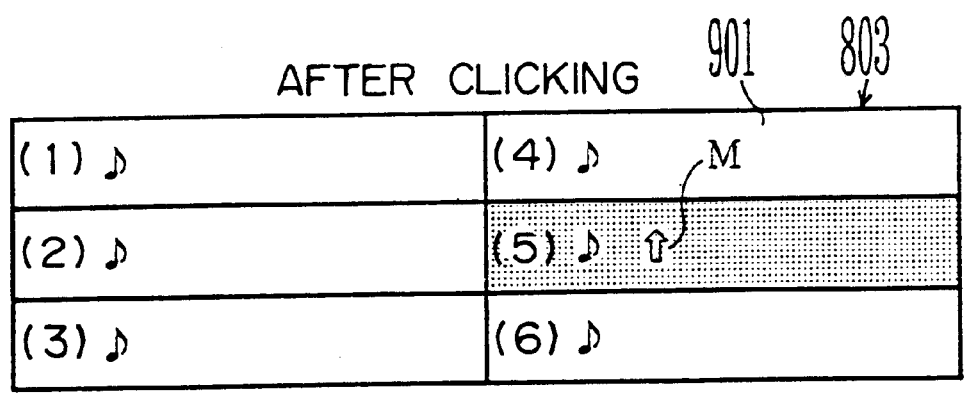

In FIGS. 9A and 9B, 901 is a word area in which words of one phrase are displayed; (1) through (6) indicate the playback order of the phrases displayed in the word areas 901, for example, in number from the beginning of the musical piece. The word area 901 currently being played back is shaded. An eighth note "K" displayed at the beginning of each of the word areas 901 is a karaoke button for specifying the performance of the karaoke version.

Figure 10:
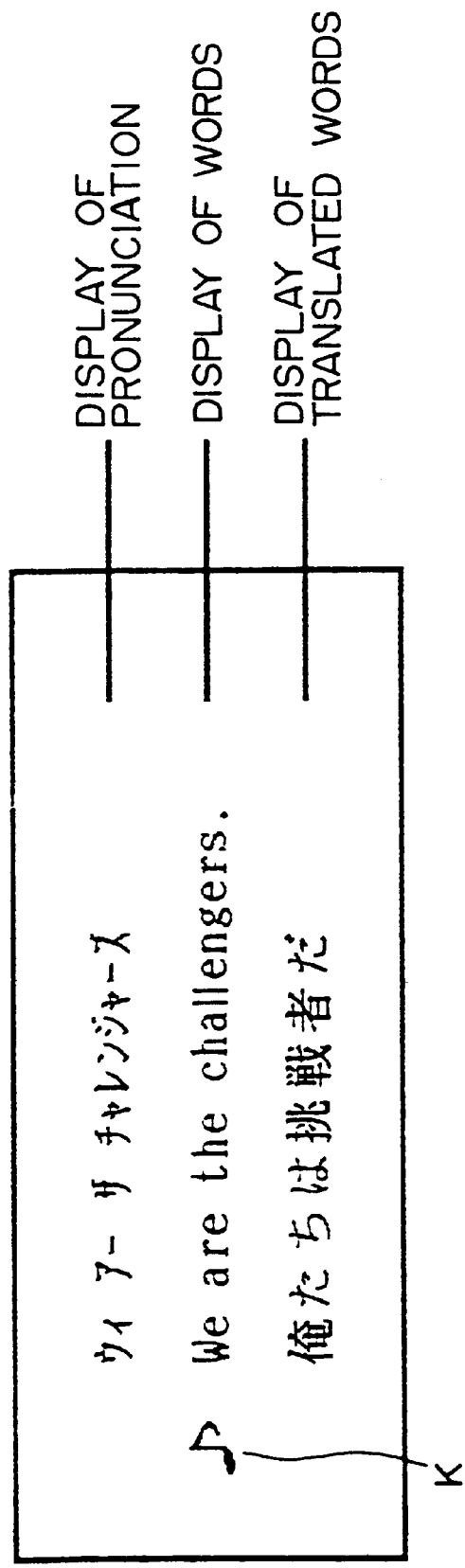
FIG. 10 exemplifies a displayed word area.

FIG. 10 exemplifies a display of the word area 901. This example displays words, and corresponding pronunciations and translated words as shown in FIG. 10. The detailed explanation is omitted here, but characters to be displayed in the word area 901 can be selected from the words, pronunciations, and translated words.

If a user specifies a musical piece, that is, if the user clicks one of the titles of musical pieces displayed in the selection list area 802, the words of that musical piece are displayed in the information area 803 as shown in FIG. 9A, and the playback is started from the word area 901 (the first phrase of the musical piece) numbered (1). The musical piece to be played back at that time is the original version.

The reproduction point is specified by clicking the word area 901 in which the phrases desired to be played back exist, that is, by operating the mouse 105 to move the mouse cursor "M" to that word area 901, and pressing the left button of the mouse 105. The content of the playback is specified by whether or not the mouse cursor "M" is positioned on the Karaoke button "K" at the time of the above described clicking operation. If the original and karaoke versions of an identical musical piece are stored in the first session 103a, the time information are linked between them, as shown in FIG. 7. The viewer software 110 identifies the phrase and the track of the original or karaoke version that the user specifies, according to the position at which the mouse cursor "M" is displayed at the time of the clicking operation, and instructs the controller 109 in the CD-ROM device 104 of the position at which the data read is to be started.

As described above, the reproduction point in phrases, and the contents of the reproduction, are changed according to a user instruction. In the example shown in FIG. 9B, the reproduction point of a phrase is switched from the word area 901 numbered (1) to the word area 901 numbered (5), in which the mouse cursor "M" is displayed, and the playback of the phrase is started in the original version. Once the playback of the phrase is started, the playback of the data is continued according to a predetermined playback procedure, for as long as the user does not give another instruction. According to the second embodiment, the phrases succeeding that phrase are sequentially played back.

As described above, the reproduction point in a musical piece is specified by the words of the phrases displayed in the word area 901. Therefore, the user can easily specify the reproduction point that he or she desires. As a result, the user load for the change operation of the reproduction point is alleviated.

Figure 11:
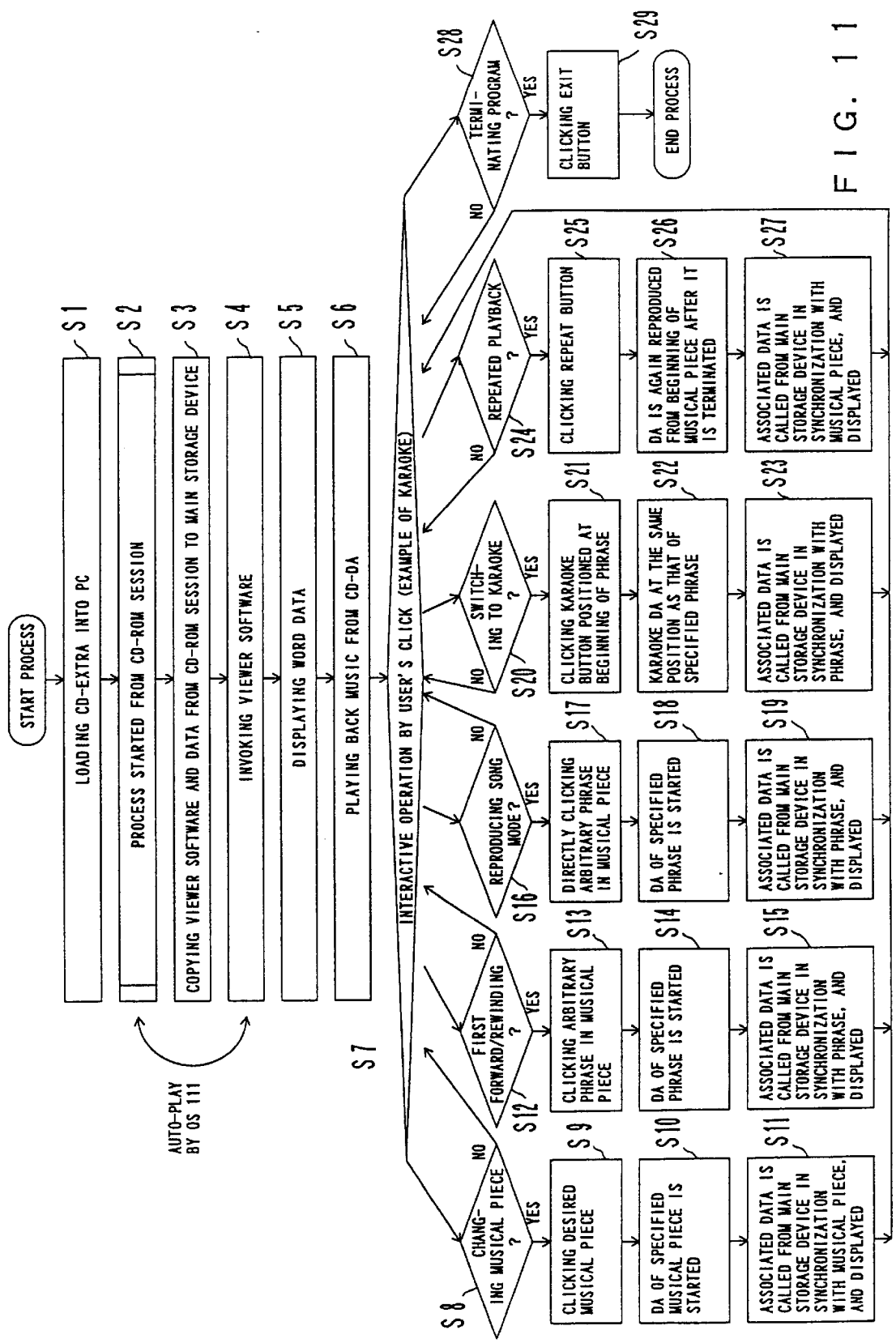
FIG. 11 is a schematic diagram explaining a flow of playing back the CD-EXTRA according to a user operation.

FIG. 11 is a flowchart showing the process for reproducing the data of the CD-EXTRA 103 according to a user operation. This figure, which is intended to exhibit the reproduction of data stored in the first session 103a, shows the extracted flow of data (limited to a karaoke version) switched according to a user operation and reproduced from when the user loads the CD-EXTRA 103 into the CD-ROM device 104 till when the viewer software 110 invoked by the loading operation is terminated. The operations of the above described viewer software 110 are explained by referring to FIG. 11.

When the user loads the CD-EXTRA 103 into the CD-ROM device 104 (step S1), this is notified from the controller 109 in the CD-ROM device 104 to the OS 111 via the driver software 112.

The OS 111 receives the notification, identifies the type of the CD loaded into the CD-ROM device 104, and checks to see if a file having a predetermined name is stored. If the user loads the CD-EXTRA 103 into the CD-ROM device 104, the CD-EXTRA 103 includes the file having the predetermined name. Accordingly, the OS 111 starts the process according to the description of that file (step S2). The load data 202 specified in the viewer software 110 and second session 103b is copied from the CD-EXTRA 103 to the main storage device 201 (step S3). The viewer software 110 is then invoked (step S4).

The viewer software 110 asks the user whether or not the succeeding operations are permitted immediately after the invocation, and starts reproduction if the user gives permission. If the user does not give permission, the flow shown in FIG. 11 is stopped at step S4.

If the user gives permission, the viewer software 110 starts reproducing the load data 202 copied to the main storage device 201, and the data stored in the first session 103a in the CD-EXTRA 103. For example, after the viewer software 110 displays the information about the CD-EXTRA 103 and the information about the contents stored in the CD-EXTRA 103, and reproduces a short introduction video, it displays the display screen 800 shown in FIG. 8 on the CRT, 102, and the words of the first musical piece stored in the first session 103a, in the information area 803 (step S5). Then, the viewer software 110 starts the reproduction of the CD-DA data of that musical piece (step S6), and enters the state in which a user operation is accepted (step S7).

Steps S8 through S29 succeeding step S7 show the operations to be performed according to the contents of the reproduction of data that the user desires, and the switching of the reproduction of the data made by the operations.

The user clicks the title of his or her desired musical piece among the titles of the musical pieces displayed in the selection list area 802, when he or she desires to change a musical piece to be played back (steps S7→S8→S9). After the title of the desired musical piece is clicked, the viewer software 110 obtains the number of the track storing the CD-DA data of the musical piece, and the data to be displayed in synchronization with the reproduction of the musical piece from the load data 202 in the main storage device 201, starts playing that musical piece, and displays the obtained data from the load data 202 on the CRT 102 (steps S10 and S11). Then, the viewer software 110 waits for a user operation while reproducing the musical piece in synchronization with the reproduction of its associated data (step S11 to step S7).

The musical piece is played back by transmitting the CD-DA data received from the controller 109 via the OS 111 and the driver software 112, to the decoder 116 via OS 111 and driver software 113, after the reproduction start point of the CD-EXTRA 103 is transmitted to the controller 109 of the CD-ROM device 104. The playback of the data associated with the musical piece is synchronized with the playback of the musical piece, for example, by obtaining the current reproduction point according to data of the Q channel in a subcode included in the above described CD-DA data, and comparing the reproduction point with the time information.

If the user desires to change a reproduction point in a musical piece, that is, to fast-forward or rewind the musical piece currently being played back, he or she clicks the word area 901 displaying his or her desired phrase in the information area 803 (steps S7→S12→S13). When the word area 901 is clicked, the viewer software 110 obtains the reproduction start point of the phrase displayed in the word area 901, and its associated data to be reproduced, from the load data 202 in the main storage device 201, starts reproducing that phrase, and displays the data obtained from the load data 202 on the CRT 102 (steps S14 and S15). For example, the viewer software 110 displays highlighted characters indicating the reproduction of the phrase, or highlights such as a background (including a change of the background color) in the word area 901. Then, it enters the state for waiting for a user operation while synchronizing the reproduction of the musical piece with the reproduction of its associated data (step S15→S7).

If the user desires to play back the original version of a musical piece (including the switching from the karaoke version to the original version), he or she clicks the word area 901 displaying the desired phrase, other than the area of the karaoke button "K" (steps S7→S16→S17). When the word area 901 is thus clicked, the viewer software 110 obtains the reproduction start point of the phrase displayed in the word area 901 by referencing the time information, and its associated data to be reproduced for that phrase from the load data 202 in the main storage device 201, starts playing back the phrase, and displays the data obtained from the load data 202 on the CRT 102 (steps S18 and S19). Then, the viewer software 110 enters the state for waiting for a user operation while synchronizing the reproduction of the musical piece with the reproduction of its associated data (step S19→S7).

When the user desires to switch from the original version of a musical piece to its karaoke version, he or she clicks the karaoke button "K" in the word area 901 displaying the desired phrase (steps S7→S29→S21). When the karaoke button "K" in the word area 901 is clicked, the viewer software 110 obtains the reproduction start point of the phrase of the karaoke version displayed in the word area 901 from the time information (refer to FIG. 7), and its associated data to be reproduced for that phrase from the load data 202 in the main storage device 201, starts playing back the karaoke version of that phrase, and displays the data obtained from the load data 202 on the CRT 102 (steps S22 and S23). The viewer software 110 then waits for a user operation while performing the playback of the musical piece in synchronization with the playback of its associated data (step S23→S7).

When the user desires to repeatedly play back a specified musical piece, he or she clicks a repeat button displayed in the command area 801 (steps S7→S24→S25). When the repeat button is clicked, the viewer software 110 restarts playing back the musical piece from its beginning upon termination of the playback of the musical piece, and displays the associated data on the CRT 102 in synchronization with the playback (Steps S26 and S27). The viewer software 110 then waits for a user operation while performing the playback of the musical piece in synchronization with the playback of the associated data (step S27→S7).

Clicking the repeat button again cancels the setting of the repeated playback after it has been clicked to set the repeated playback. However, since the cancellation of that setting does not directly affect the playback operations of data, the process relating to the cancellation of the setting is omitted in FIG. 11.

When the user desires to terminate the viewer software 110, he or she clicks an EXIT button displayed in the command area 801 (steps S7→S28→S29). When the EXIT button is clicked, the OS 111 cancels the allocation of the CPU to the viewer software 110, and terminates the viewer software 110.

Then, the OS 111 erases the viewer software 110 loaded into the main storage device 201, and the load data 202 stored in the main storage device 201, and any excess data stored in the auxiliary storage device 106. This is because the size of the viewer software 110 is relatively small (it does not require a lot of time to read from the CD-EXTRA 103, and the capacity required for its storage is small), and the CD-EXTRA 103 must be loaded into the CD-ROM device 104 in order to synchronize the playback of the load data 202 with the playback of the audio data (CD-DA data) which is read from the CD-EXTRA 103. This process prevents the use efficiency of the auxiliary storage device 106 from deteriorating. However, since the capacity of an auxiliary storage device 106 has become larger recently, the viewer software 110 and the load data 202 read from the CD-EXTRA 103 may remain stored in the auxiliary storage device 106, depending on need.

Figure 12:
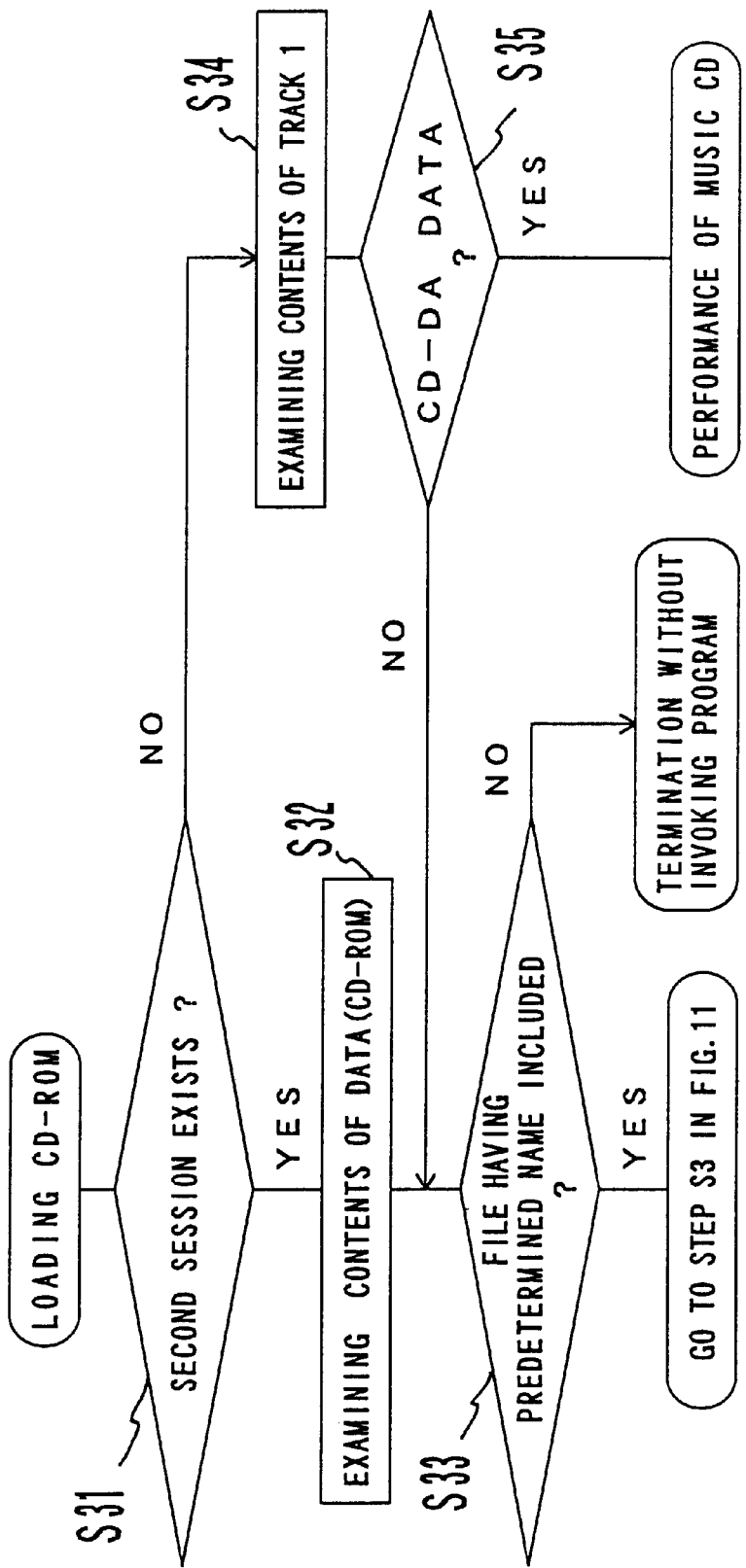
FIG. 12 is a flowchart showing a CD auto-play process performed by an operating system.

FIG. 12 shows the details of step S2 in FIG. 11. As described above, this is the process performed by the OS 111 when a user loads a CD into the CD-ROM device 104.

When the user loads a CD into the CD-ROM device 104, the controller 109 in the CD-ROM device 104 detects it, and identifies the type of the loaded CD. The controller 109 notifies the OS 111 of, for example, the loading of the CD into the CD-ROM device 104, TOC information, and the type of the CD (whether or not the CD is an enhanced CD). FIG. 12 shows the flow of the process when the notification is received. The detailed explanation about this process is provided below by referring to FIG. 12.

Whether or not the CD is an enhanced CD is determined as follows: the controller 109 makes the read head 108 perform seek operations over the entire CD in order to check to see if there are markings indicating a separation between areas in the CD.

In step S31, it is determined whether or not the CD loaded into the CD-ROM device 104 is an enhanced CD, that is, whether or not the CD includes the second session 103b, based on the information transmitted from the controller 109.

If "YES", the process goes to step S32 to examine the type of data stored in the second session 103b. As is known, the formats of data stored in partitioned areas are different, depending on a data type of the enhanced CD. Therefore, the type of the enhanced CD can be identified by examining its contents. Whether the data is either the CD-ROM data or the CD-DA data can be determined based on the data of the Q channel in a subcode, or the contents of a header in a sector.

In step S33, it is determined whether or not the CD stores a file having a predetermined name. Assume that the predetermined name is, for example, "Autorun.inf". If a file having that name is stored, the process goes to the execution of the process according to the contents described in that file (S33:YES). That is, the process transfers from step S2 to step S3, shown in FIG. 11. If "NO", the process relating to the CD is terminated (step S33:NO).

If it is determined that the CD does not include the second session 103b in step S31, that is, "NO", the process goes to step S34 where the data stored in the track numbered 1 is read, and its format is examined. This data read is implemented as follows: the OS 111 transmits the data at the beginning of the track obtained according to the TOC information, to the controller 109 in the CD-ROM device 104 as a control command.

In step S35, it is determined whether or not the data transmitted from the controller 109 is the CD-DA data. If CD-DA data is stored in the track, the result of the determination is "YES", and control is transferred to the process for starting the playback (performance) as a music CD. If "NO" (for example, if the CD is a CD-ROM), the process goes to step S32 to determine whether or not the file having a predetermined name is stored. The succeeding operations are performed according to its result.

Figure 13:
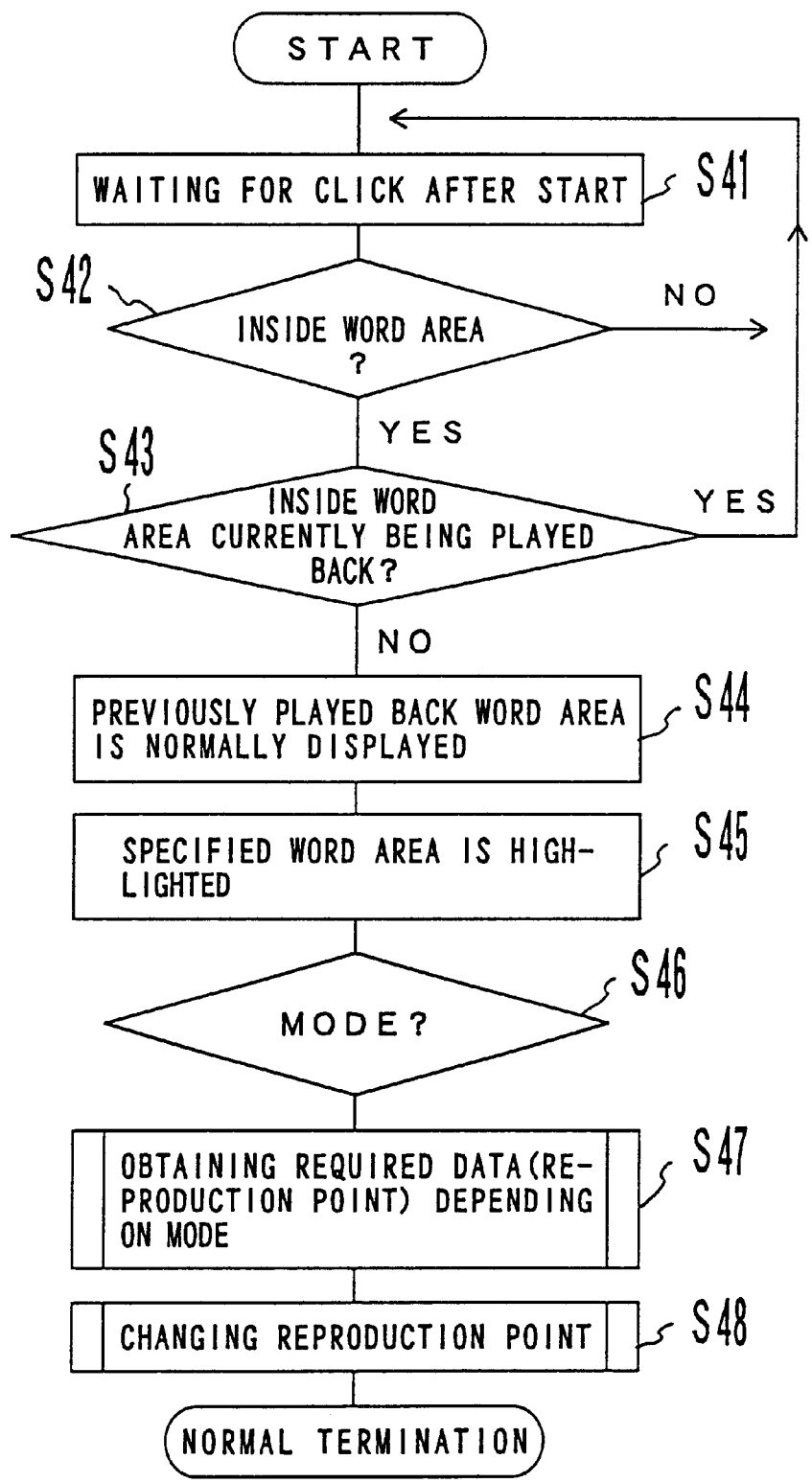
FIG. 13 is a flowchart showing a reproduction point change process.

FIG. 13 is a flowchart showing the process for changing a reproduction point, which is performed by the viewer software 110 when a user clicks the word area 901 including the karaoke button "K". In the flowchart shown in FIG. 11, the operations from step S14 to step S15, from step S18 to step S19, and from step S22 to step S23, are implemented by performing the process for changing a reproduction point.

Once the viewer software 110 starts playing back a musical piece, it is in a state of waiting for an event that a user selects on the display screen 800 of the CRT 102 while performing the necessary process. When the user selects on the display screen 800 in this state, the viewer software 110 obtains the information about the position of the clicking operation of the mouse 105 (display position information of the mouse cursor "M") via the driver software 115 and the OS 111 (step S41). After the viewer software 110 obtains the display position information, it determines whether or not the mouse cursor "M" is displayed in the word area 901 at the time of the clicking operation according to the display position information of the mouse cursor "M" (step S42).

If it is determined that the display position of the mouse cursor "M" at the time of the clicking operation is outside the word area 901 (step S42:NO), the process goes back to step S41 where the viewer software 110 waits for a new clicking operation. If it is determined that the display position is inside the word area 901 (step S42:YES), it is then determined whether or not the display position is inside the word area 901 currently being played back (step S43). If the display position is determined to be inside the word area 901 currently being played back (step S43:YES), the process goes back to step S41.

If it is determined that the display position of the mouse cursor "M" at the time of the clicking operation is outside the word area 901 currently being played back (step S43:NO), the word area 901 corresponding to the phrases currently being played back is normally displayed (step S44). Then, the word area 901 that the user specified with the clicking operation is highlighted (step S45).

With this process, the display screen 800 (information area 803) of the CRT 102 varies from FIG. 9A to FIG. 9B. That is, the word area 901 numbered (5), which is clicked by the user, is highlighted, and at the same time, the word area 901 numbered (1) is changed to a normal display.

When the word area 901 specified by the user is highlighted, it is then determined whether the mode which is currently set, that is, the specified playback, is either the karaoke version or the original version (step S46). Then, the data required for playing back the musical piece is obtained from the load data 202 according to the determined mode (step S47). The reproduction start time of the phrases in the specified word area 901 is obtained at this time.

Then, the viewer software 110 instructs the controller 109 of the data read position via the OS 111 and the driver software 112, based on the obtained data, and displays the data obtained in step S47 on the display screen 800 of the CRT 102. Then, the viewer software 110 enters a state of waiting for a next user selection (step S48).

As described above, the viewer software 110 synchronizes the reproduction of the CD-EXTRA 103 as a music CD, that is, the reproduction of the CD-DA data stored in the first session 103a with the reproduction of the data stored in the second session 103b. This operation is common to the case in which a musical piece is played back from its beginning.

According to the second embodiment, words are displayed in phrases, and a reproduction point is changed by specifying a phrase. However, the reproduction point may be changed, for example, by specifying a reproduction elapsed time from the beginning of a musical piece. Additionally, the reproduction point may be changed according to a specified number among numbers, each of which is assigned to each of changeable reproduction points. Furthermore, an arbitrary reproduction point may be specified not only in one musical piece, but also in a plurality of musical pieces.

Still further, a user may specify the contents of the karaoke version or the original version to be reproduced in each word area (phrase) 901, for example, when a plurality of word areas 901 are displayed on the CRT 102 as shown in FIG. 9

In both of the above described cases, associated data stored in different areas in the CD-EXTRA 103 are synchronized and reproduced, so that the stored data can effectively be used. As a result, a variety of data reproduction forms can be provided to users, and at the same time, the CD-EXTRA 103 can be provided to the users as a more sophisticated and entertaining product.

Provided next is the explanation about another example of the reproduction of the CD-EXTRA 103, and the operations performed by the viewer software 110 for implementing the reproduction.

The fundamental operation of the previous example is to perform the reproduction of text data such as words, etc., in synchronization with the reproduction of a musical piece (CD-DA data). In the meantime, this example is intended to reproduce still pictures in addition to text data. The explanation about this example is provided below by referring to FIGS. 14 through 17.

Figure 14:
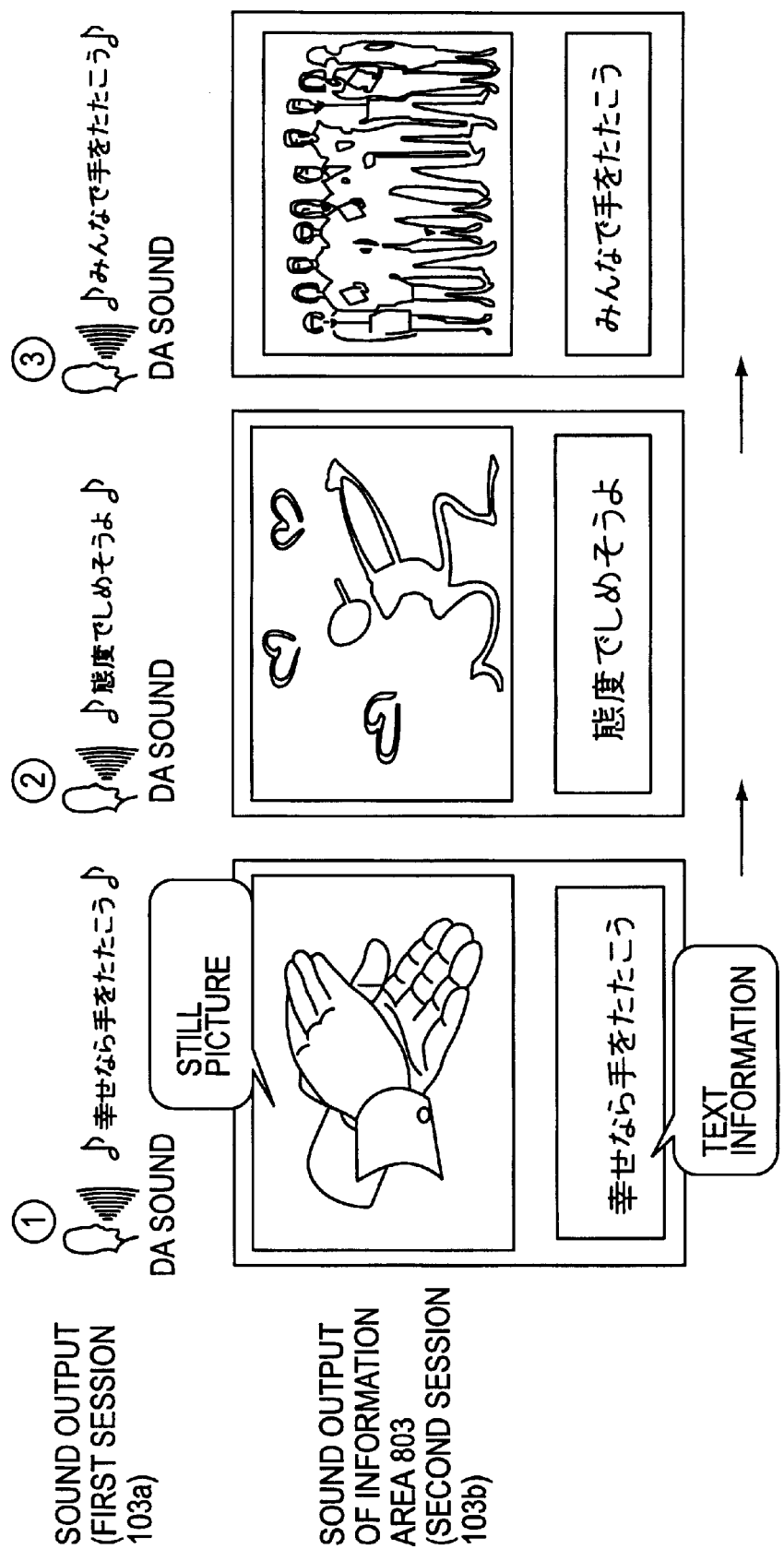
FIG. 14 shows another playback example of a CD-EXTRA (No.1)
Figure 15:
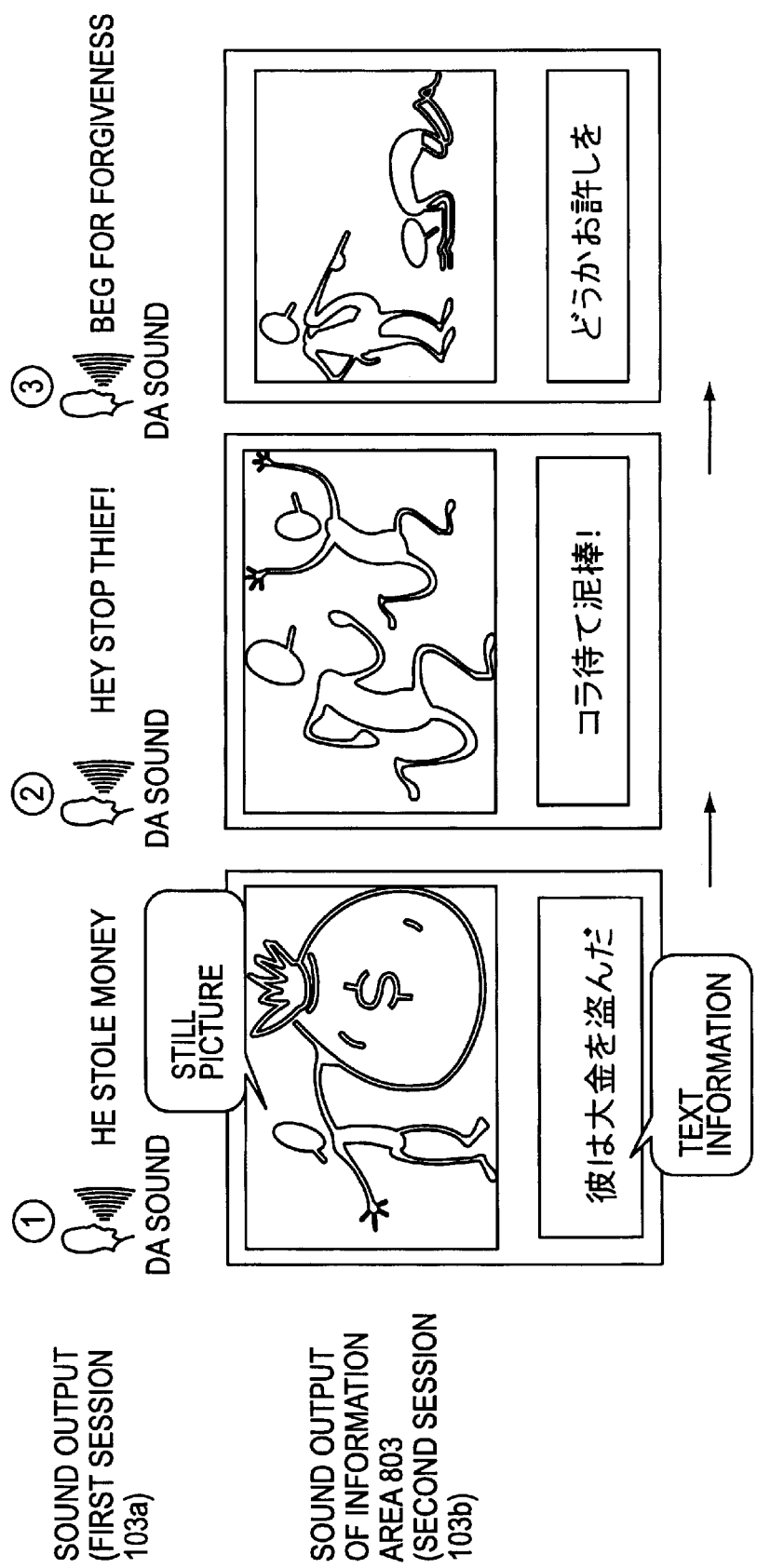
FIG. 15 shows a further playback example of the CD-EXTRA (No.2)

FIGS. 14 and 15 show another example of the reproduction of the CD-EXTRA. These figures exemplify the case in which pictures and words corresponding to a musical piece in the load data 202 are displayed in synchronization with the reproduction of the CD-DA data stored in the first session 103a.

In the example shown in FIG. 14, the musical piece is played back by reproducing the CD-DA data in the first session 103a, and the still pictures and words associated with this musical piece are obtained from the load data 202, and displayed in synchronization with the playback of the musical piece. The still pictures are intended to match the story of the musical piece. As a result, a user can enjoy karaoke while experiencing the atmosphere of the musical piece from the still pictures.

The example shown in FIG. 15 is similar to that shown in FIG. 14 in which the vocal reproduction is synchronized with the reproduction of still pictures and words, but FIG. 15 exemplifies the case in which the language of the words to be displayed is different from that of the words to be uttered. Specifically, this is the case in which the language of the words to be uttered is English, while the language of the words to be displayed is Japanese.

Such reproduction allows a user to learn audiovisually, which leads to attaining a great effect from the learning. When the scenes (still pictures) representing and accompanying the contents (story) of the reproduced sound are sequentially displayed as shown in FIG. 15, the visual information is added to the correspondence between English and Japanese. Therefore, English can be learned more easily, and a great learning efficiency of the foreign language can be obtained. Accordingly, the CD-EXTRA 103 can be provided as a teaching material for performing an effective learning of a foreign language.

Note that words to be displayed may be pronunciations or words in another language, instead of the translated words of the words to be uttered. Further, a user may select the type of the words to be displayed.

Figure 16:
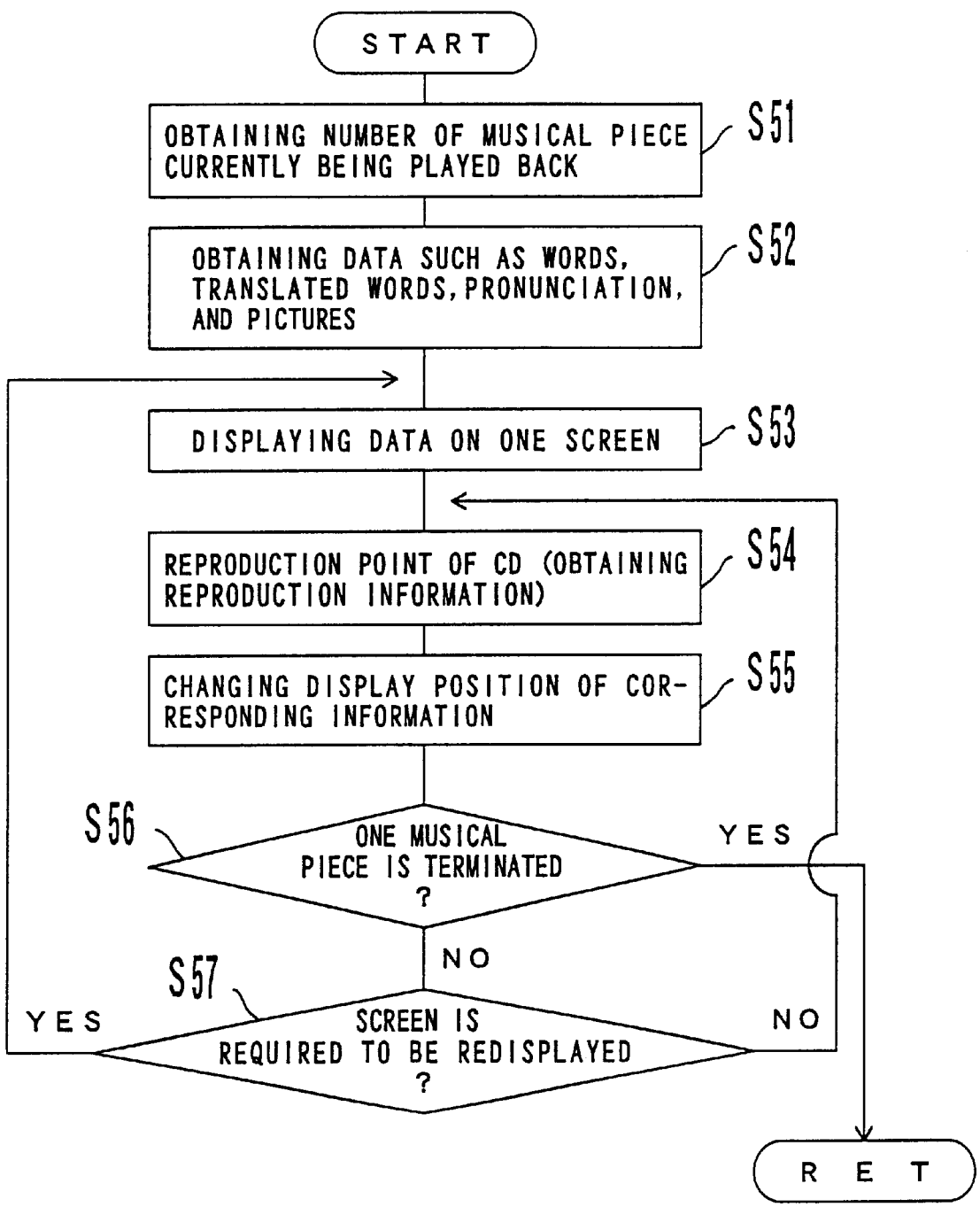
FIG. 16 is a flowchart showing a playback process of associated data.

Provided next is the explanation about the operations performed by the viewer software 110 which synchronizes the above described vocal reproduction (data in the first session 103a) with the reproduction of associated data in the load data 202, by referring to FIG. 16. FIG. 16 is a flowchart showing the process for reproducing associated data. To avoid confusion, the explanation provided below is based on the assumption that the CD-DA data in the first session 103a is data of a musical piece.

With the process for reproducing associated data, the number of a musical piece currently being played back (its playback start has been instructed) is obtained (step S51). Next, the text data (words, translated words, and pronunciations) and picture (still picture) data which are associated with the obtained number of the musical piece are obtained from the load data 202 in the main storage device 201 (step S52).

When the associated data are obtained, they are displayed on one screen in order to match the portion of the musical piece currently being played back (step S53). The operation performed in step S53 switches between a still picture and a display of words. Then, the current reproduction point of the CD-EXTRA 103, for example, the time elapsed from the beginning of the playback of the musical piece having the obtained number (reproduction elapsed time), is obtained as reproduction information (step S54). The reproduction elapsed time is a reproduction point in a musical piece currently being played back, which is transmitted from the controller 109 in the CD-ROM device 104 to the viewer software 110, that is, a performance point. The performance point is data indicating what minute, what second, and which frame is being played back. When such reproduction information (reproduction point) is obtained, the change of a display position such as one caused by highlighting words corresponding to the reproduction information (step S55), is made.

After words are highlighted in real time as a musical piece is being played back as described above, it is then determined whether or not the playback of the musical piece is terminated (step S56). This determination is made, for example, by making a comparison between the performance time of the musical piece obtained from the TOC information and the above described reproduction elapsed time obtained in step S54.

If it is determined that the performance of the musical piece is terminated in step S56 (step S56: YES), the process is terminated. If it is determined that the performance of the musical piece is not terminated (step S56: NO), the process goes to step S57.

According to the second embodiment, the entire picture (still picture and words) displayed on the display screen 800 (information area 803) is changed (redisplayed) each time one phrase is reproduced. Therefore, whether or not a picture must be redisplayed is determined depending on whether or not the reproduction of one phrase is terminated in step S57. This determination is made, for example, by comparing the reproduction end time of the phrase in the time information and the reproduction elapsed time indicating the reproduction point, which is obtained in step S54.

If it is determined that the performance of one phrase is not terminated in step S57 (step S57: NO), the process goes back to step S54. This is because the redisplay of a picture is regarded as being unnecessary. If it is determined that the performance of one phrase is terminated (step S57:YES), the process goes back to step S53. That is, the redisplay of a picture is regarded as being necessary. With the operation performed in step S53, another still picture and new words are displayed in the information area 803.

As described above, the viewer software 110 synchronizes the reproduction of the data stored in the first session 103a in the CD-EXTRA 103 with the reproduction of data in the load data 202, that is, the data of different representation media (still pictures and words), which are stored in the second session 103b. With this process, the reproduction of the data shown in FIGS. 14 and 15 can be realized.

Figure 17:
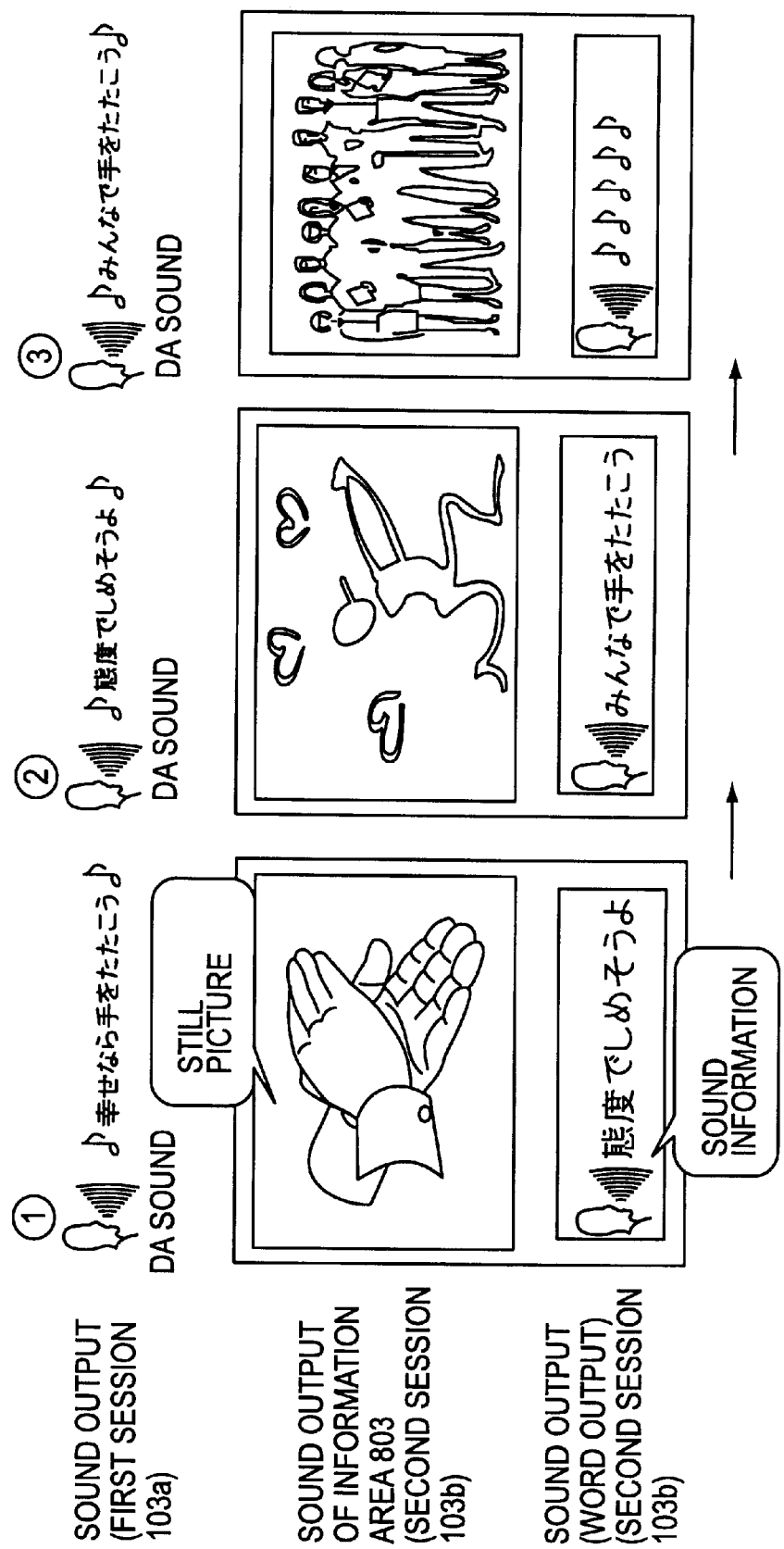
FIG. 17 shows a further playback example of the CD-EXTRA (No.3)

The above described example is one implemented by synchronizing the reproduction of the CD-DA data stored in the first session 103a with the reproduction of display data such as still pictures and words. However, data for outputting sound (such as MPEG data, MIDI data, etc.) may be stored in the second session 103b in the CD-EXTRA 103. FIG. 17 shows the example in which the reproduction of the CD-DA data is synchronized with the reproduction of the data for outputting sound in the load data 202.

As shown in FIG. 17, the phrase to be played back next to the phrase currently being played back is output as vocal sound by reproducing the data in the load data 202, that is, the data stored in the second session 103b. This aims at, for example, helping people who are visually handicapped learn a phrase to be sung next in advance, and sing the song. With this process, the CD-EXTRA 103 can be provided to more people as a more useful form. The phrase to be sung next may be output to different channels such as earphones intended for phrases, a speaker intended for sound output by reproducing the CD-DA data, etc., in order to prevent the phrase from becoming inaudible due to the sound output of the reproduction of the CD-DA data.

As described above, the correspondence between the CD-DA data and the associated data is defined in phrases. Therefore, the reproduction shown in FIG. 17 can be implemented by reproducing the associated data in the load data 202, and advancing the correspondence by one phrase. In other words, this reproduction can fundamentally be implemented by performing the process exactly the same as that of the flowchart shown in FIG. 16. Accordingly, the explanation about the process performed by the viewer software 110 in order to implement the example shown in FIG. 17, is omitted here.

Although the words of the phrases are not displayed in the example shown in FIG. 17, words as well as sound may be displayed. Additionally, such reproduction may be performed not only for music, but also for learning a foreign language.

Conventionally, when pictures and sound are desired to be reproduced simultaneously, those data are compressed with the MPEG encoding method, etc., and stored. However, the reproduction by making various combinations of the load data 202 and the data stored in the first session 103a can be performed by loading the data stored in the second session 103*b* in the CD-EXTRA 103 into the PC 101 as described above. As a result, even if picture and sound data are stored in different storage areas, the pictures and sound can simultaneously be reproduced. This means that the restriction depending on the contents to be reproduced of data stored in the storage medium, can be reduced. Therefore, data stored in a storage medium can be selected depending on need. According to the second embodiment, sound of high quality can constantly be obtained by reproducing the CD-DA data (uncompressed data) stored in the first session 103*a* in synchronization with the display of pictures.

Figure 18:
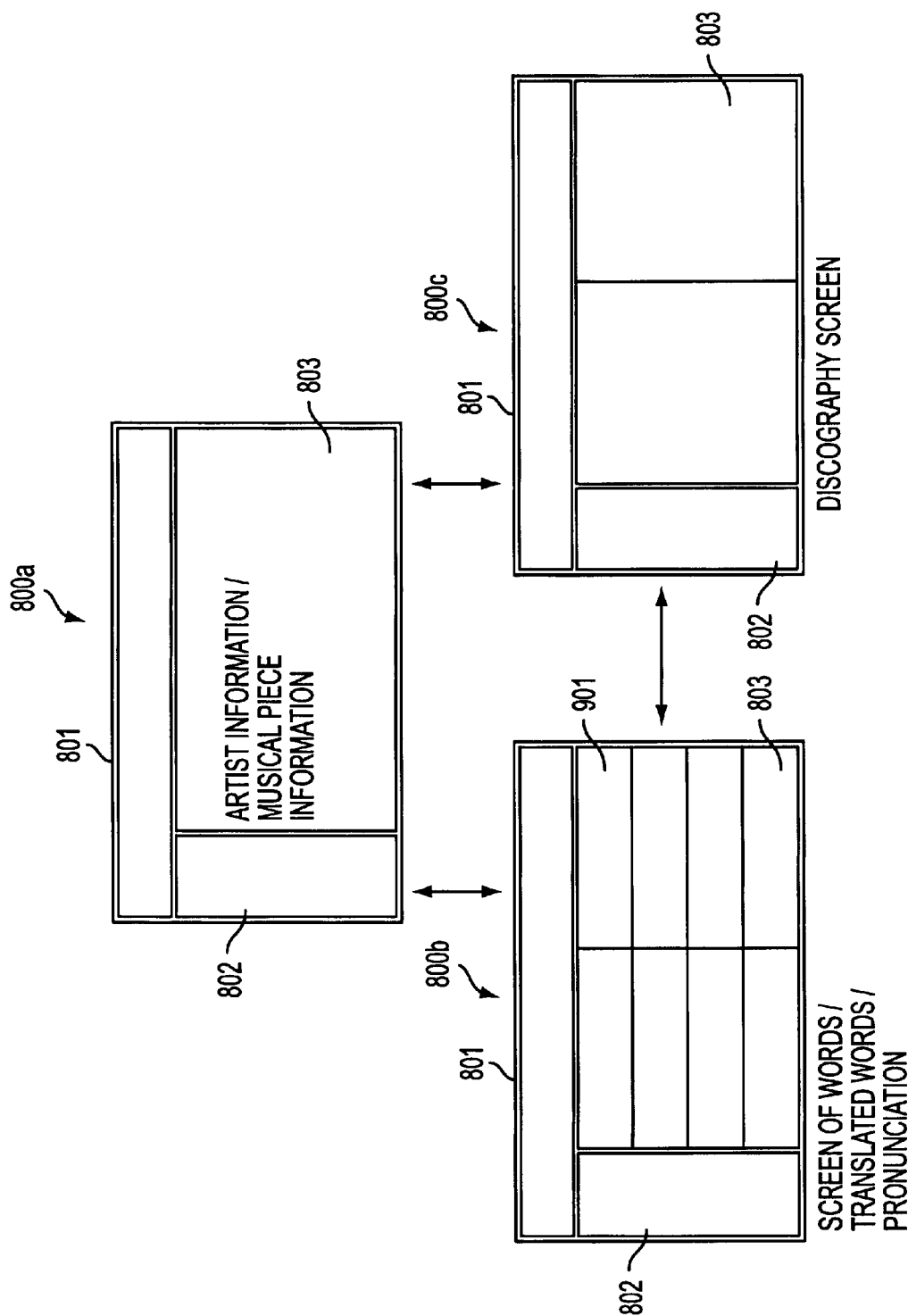
FIG. 18 is a schematic diagram explaining a modification of the method for playing back a CD-EXTRA.

In this embodiment, a user arbitrarily selects the data to be reproduced in synchronization with the reproduction of the CD-DA data, among the data associated with the CD-DA data. However, a mode for mainly displaying artist information and musical piece information (artist/musical information mode), a mode for mainly displaying words, translated words, and pronunciation (word display mode), and a mode for mainly displaying discography (discography mode), may be prepared, and at the same time the basic structure of data to be displayed in the information area 803 may be predetermined for each mode, FIG. 18 shows examples of the display screen 800 in each mode. A display screen 800*a* is in the artist/musical piece information mode; a display screen 800*b* is in the word display mode; and a display screen 800*c* is in the discography mode.

<Third Embodiment>

According to the above described second embodiment, the data stored in the second session 103*b* is reproduced in synchronization with the CD-DA data stored in the first session 103*a*. In the meantime, according to the third embodiment, a user can add data to be synchronized with the reproduction of the CD-DA data to the data stored in the second session 103*b*.

Figure 19:
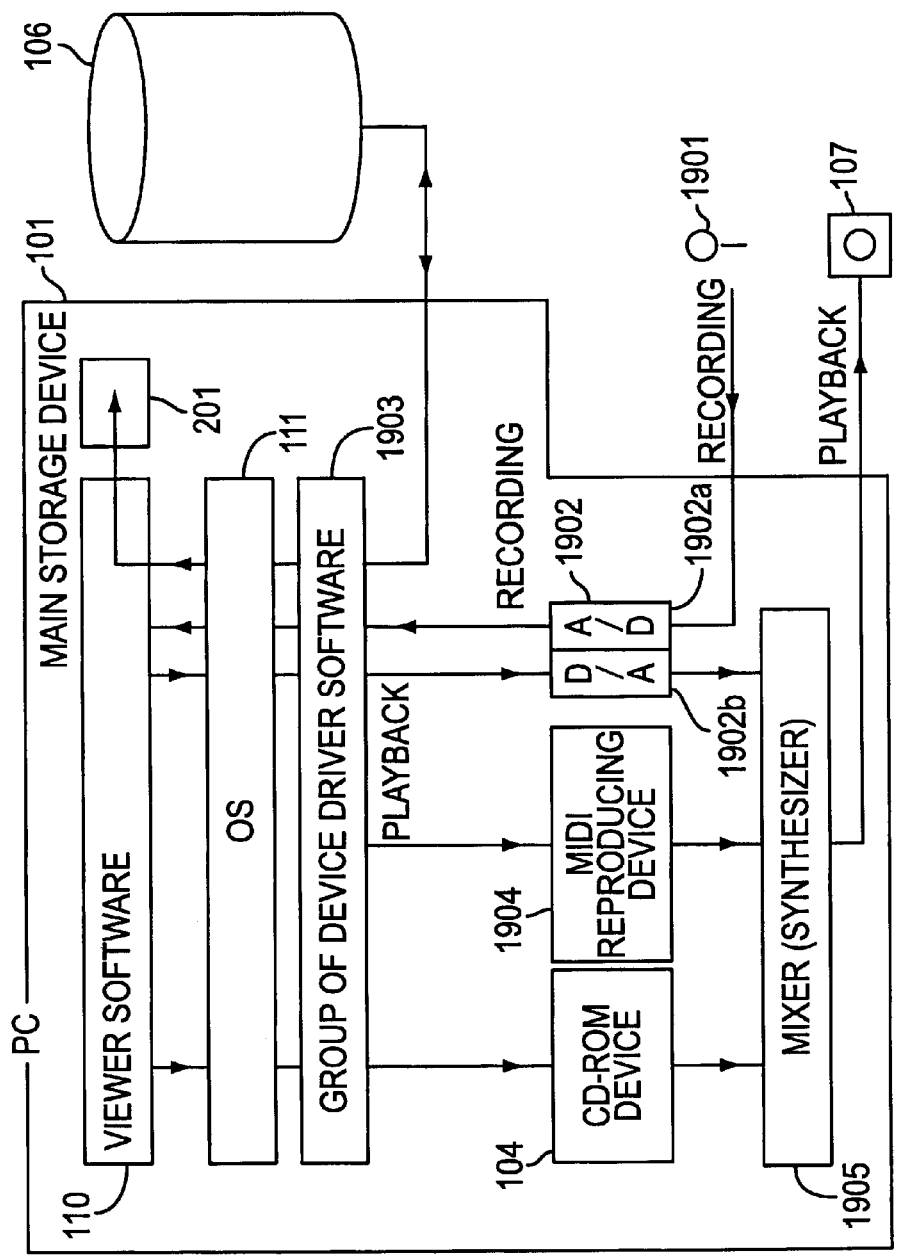
FIG. 19 is a simplified block diagram showing the system configuration of a third embodiment.

FIG. 19 is a simplified block diagram showing the configuration of a sound playback/display system according to the third embodiment. In this figure, the same portions or the portions almost the same as those in the second embodiment, are denoted by the same reference numerals. The CRT 102 is omitted in FIG. 19. Provided below is the explanation about the third embodiment, by referring to FIG. 19.

In the third embodiment, an A/D converter 1902*a* in a converter 1902 converts a user's voice input from a microphone 1901 sung to the tune of the music into digital audio data; and the viewer software 110 receives the digital audio data via a corresponding driver software among a group of device driver softwares 1903, and the OS 111, and can store the data in the auxiliary storage device 106 via the OS 111, and the corresponding driver software for the auxiliary storage device 106 among the group of device driver softwares 1903.

The viewer software 110 stores the audio data in the auxiliary storage device 106 in phrases in synchronization with a reproduction point in the CD-EXTRA 103. With this process, the input user's voice can be played back in synchronization with the CD-DA data, and the load data 202 stored in the second session 103*b*.

To play back the user's audio data stored in the auxiliary storage device 106, the viewer software 110 outputs the data to a D/A converter 1902*b* in the converter 1902 via the OS 111 and the corresponding driver software among the group of device driver softwares 1903, after it receives the user's audio data via the driver software for the auxiliary storage device 106 and the OS 111. The audio data input to the D/A converter 1902*b* is converted into analog audio signals, output to a mixer 1905, and output from a sound output device 107 as vocal sound.

An audio signal generated based on MIDI data that a MIDI reproducing device 1904 receives from the viewer software 110 via the OS 111 and the corresponding driver software among the group of device driver softwares 1903, and an audio signal generated by D/A converting the CD-DA data read by the CD-ROM device 104, are input to the mixer 1905 in addition to the audio signal input from the D/A converter 1902*b*. The mixer 1905 synthesizes these signals according to predetermined contents, and outputs the synthesized signals to the sound output device 107.

As described above, when a user can prepare data to be reproduced in synchronization with data in the CD-EXTRA 103, a wider variety of entertainment using the CD-EXTRA 103 can be realized, in comparison with those realized according to the second embodiment. Furthermore, the user can display his or her originality, thereby obtaining deeper satisfaction.

Data such as photos, text (including the latest information about an artist), MIDI data, etc. may be added in addition to the above described audio data, as the data that a user can prepare. The prepared data may be erased upon termination of the viewer software 110. Otherwise, it may be stored in the auxiliary storage device 106.

As is evident from the explanations about the above described first through third embodiments, data stored in a storage medium is stored in another storage medium, and other data stored in a storage medium is reproduced in synchronization with data stored in another storage medium, according to the present invention. Accordingly, the use forms of the storage medium can be diversified, and a wider variety of users' entertainments can be realized. As a result, the storage medium can be provided to a user as a more satisfying and entertaining tool.

What is claimed is:

1. A computer readable first storage medium, for use in a playback system, comprising:

first and second storage areas distinguished by different forms of stored data, wherein one of the first and second storage areas of the first storage medium includes reproduction management information for use by the playback system in synchronizing and reproducing data respectively stored in both the first and second storage areas of the first storage medium.

2. The storage medium according to claim 1, wherein:

one of the first and second storage areas of the first storage medium stores a program controlling a computer to synchronize and reproduce data stored in one of the first and second storage areas of the first storage medium with data which was stored in the other of the storage areas of the first storage medium and has been transferred to a second storage medium, based on the reproduction management information.

3. A computer readable first storage medium comprising a program controlling a computer to:

transfer data stored in one of first and second storage areas from the first storage medium, with the first and second storage areas being distinguished by different forms of stored data, to a second storage medium; and synchronize and reproduce data stored in the other of the first and second storage areas with the data transferred to the second storage medium, based on reproduction management information that is prepared in advance to synchronize and reproduce data respectively stored in the first and second storage areas.

4. A storage medium playback system, comprising:

a first reading unit to read data stored in one of first and second storage areas, from a first storage medium, with the first and second storage areas of the first storage medium being distinguished by different forms of stored data, and to store the read data in a second storage medium;

a first reproducing unit to reproduce data stored in the other of the first and second storage areas of the first storage medium, which is read by said first reading unit;

a second reading unit to read the data stored in the second storage medium;

a second reproducing unit to reproduce the data read by said second reading unit; and a controlling unit to synchronize reproduction of data by said first reproducing unit with reproduction of data by said second reproducing unit, based on reproduction management information that is prepared in advance for synchronizing and reproducing the data respectively stored in the first and second storage areas.

5. The storage medium playback system according to claim 4, wherein the reproduction management information is information which is read from one of the storage areas of the first storage medium by said first reading unit, and stored in the second storage medium.

6. The storage medium playback system according to claim 4, further comprising:

reproduction point specifying unit to specify a reproduction point in data units of data stored in one of the storage areas of the first storage medium, wherein said controlling unit changes the data reproduced by said first and second reproducing units based on the reproduction management information, when the reproduction point is specified by said reproduction point specifying unit.

7. The storage medium playback system according to claim 6, wherein said reproducing point specifying unit specifies at least one of the reproduction point and reproduction form, when associated data of a different reproduction form is stored in the data units in one of the storage areas of the first storage medium.

8. The storage medium playback system according to claim 7, wherein the associated data of different reproduction forms are data of an original version of a musical piece, and data of a karaoke version of the musical piece.

9. The storage medium playback system according to claim 6, wherein the data units of data are musical pieces, and specification of the reproduction point is made in phrases.

10. The storage medium playback system according to claim 9, wherein the specification of the reproduction point in phrases is made at a position of the words, translated words, or pronunciation of a musical piece, by displaying the words, translated words, and pronunciation of the musical piece.

11. The storage medium playback system according to claim 4, wherein the data stored in the other of the storage areas of the first storage medium is audio data, and the second storage medium stores at least data associated with the audio data from one of the storage areas of the first storage medium.

12. The storage medium playback system according to claim 11, wherein at least one of text data such as words, translated words, and pronunciation of a musical piece corresponding to the audio data, is the at least data associated with the audio data stored in the second storage medium.

13. The storage medium playback system according to claim 4, wherein at least one of the first and second storage media is an enhanced CD.

14. The storage medium playback system according to claim 4 is configured by using a personal computer.

15. A storage medium playback method for reproducing a first storage medium having first and second storage areas being distinguished by different forms of stored data, comprising:

preparing reproduction management information for synchronizing and reproducing data respectively stored in the first and second storage areas of the first storage medium;

transferring the data stored in one of the first and second storage areas of the first storage medium to a second storage medium; and synchronizing reproduction of data stored in the other of the first and second storage areas of the first storage medium with reproduction of the transferred data stored in the second storage medium, based on the reproduction management information.

16. The storage medium playback method according to claim 15, wherein the data stored in the other of the first and second storage areas of the first storage medium is audio data, and the second storage medium stores at least data associated with the audio data from one of the storage areas.

17. The storage medium playback method according to claim 16, wherein at least one of text data such as words, translated words, and pronunciation of a musical piece corresponding to the audio data, is included as the at least data associated with the audio data stored in the second storage medium.

18. The storage medium playback method according to claim 15, wherein at least one of the first and second storage media is an enhanced CD.

* * * * *